US008460838B2

(12) United States Patent
Gillett et al.

(10) Patent No.: US 8,460,838 B2
(45) Date of Patent: *Jun. 11, 2013

(54) GENERATOR MODULE ARCHITECTURE FOR A LARGE SOLID OXIDE FUEL CELL POWER PLANT

(75) Inventors: James E. Gillett, Greensburg, PA (US);
Paolo R. Zafred, Murrysville, PA (US);
Matthew W. Riggle, Ford City, PA (US);
Kevin P. Litzinger, Level Green, PA (US)

(73) Assignee: Siemens Energy, Inc., Orlando, FL (US)

( * ) Notice: Subject to any disclaimer, the term of this patent is extended or adjusted under 35 U.S.C. 154(b) by 966 days.

This patent is subject to a terminal disclaimer.

(21) Appl. No.: 12/543,738

(22) Filed: Aug. 19, 2009

(65) Prior Publication Data

US 2011/0045373 A1 Feb. 24, 2011

(51) Int. Cl.
*H01M 8/12* (2006.01)
*H01M 8/24* (2006.01)

(52) U.S. Cl.
USPC ........... 429/466; 429/441; 429/458; 429/460; 429/469

(58) Field of Classification Search
USPC ................... 429/466, 441, 458, 460, 469, 13, 429/17, 26, 31, 34, 30, 32; D13/103, 112, D13/119, 122
See application file for complete search history.

(56) References Cited

U.S. PATENT DOCUMENTS

| 4,374,184 A | 2/1983 | Somers et al. |
| 4,428,895 A | 1/1984 | Blasch et al. |
| 4,476,198 A | 10/1984 | Ackerman et al. |
| 4,490,444 A | 12/1984 | Isenberg |
| 4,520,082 A | 5/1985 | Makiel |
| 4,569,920 A | 2/1986 | Smith-Johannsen |
| 4,664,986 A | 5/1987 | Draper et al. |
| 4,728,584 A | 3/1988 | Isenberg |
| 4,801,369 A | 1/1989 | Draper et al. |
| 4,874,678 A | 10/1989 | Reichner |
| 5,741,605 A * | 4/1998 | Gillett et al. ................. 429/415 |

(Continued)

FOREIGN PATENT DOCUMENTS

WO WO 02/37589 5/2002

OTHER PUBLICATIONS

Nguyen Q. Minh, "Ceramic Fuel Cells", Journal of the American Ceramic Society, vol. 76, No. 3, pp. 563-588.

*Primary Examiner* — Basia Ridley
*Assistant Examiner* — Caitlin Wilmot

(57) ABSTRACT

A solid oxide fuel cell module contains a plurality of integral bundle assemblies, the module containing a top portion with an inlet fuel plenum and a bottom portion receiving air inlet feed and containing a base support, the base supports dense, ceramic exhaust manifolds which are below and connect to air feed tubes located in a recuperator zone, the air feed tubes passing into the center of inverted, tubular, elongated, hollow electrically connected solid oxide fuel cells having an open end above a combustion zone into which the air feed tubes pass and a closed end near the inlet fuel plenum, where the fuel cells comprise a fuel cell stack bundle all surrounded within an outer module enclosure having top power leads to provide electrical output from the stack bundle, where the fuel cells operate in the fuel cell mode and where the base support and bottom ceramic air exhaust manifolds carry from 85% to all 100% of the weight of the stack, and each bundle assembly has its own control for vertical and horizontal thermal expansion control.

26 Claims, 14 Drawing Sheets

U.S. PATENT DOCUMENTS

| | | |
|---|---|---|
| 5,916,700 A | 6/1999 | Ruka et al. |
| 6,656,623 B2 | 12/2003 | Holmes et al. |
| 7,157,172 B2 | 1/2007 | Draper et al. |
| 7,320,836 B2 | 1/2008 | Draper et al. |
| 7,364,812 B2 | 4/2008 | Taylor et al. |
| 8,163,433 B2 * | 4/2012 | Zafred et al. .................. 429/466 |
| 2006/0035128 A1 * | 2/2006 | Draper et al. .................. 429/32 |
| 2008/0003478 A1 | 1/2008 | Greiner et al. |
| 2008/0011442 A1 * | 1/2008 | Pankl ............................. 164/61 |

* cited by examiner

GENERATOR MODULE ARCHITECTURE FOR A LARGE SOLID OXIDE FUEL CELL POWER PLANT

GOVERNMENT CONTRACT

The Government of the United States of America has rights in this invention pursuant to Contract No. DE-FC26-05NT42613 awarded by the U.S. Department of Energy.

BACKGROUND OF THE INVENTION

1. Field of the Invention

This invention relates to a useful, competitive commercial design that must be used for solid oxide electrolyte fuel cells to be a cost effective power source. The present invention relates to the arrangement of fuel cell module components necessary to construct an array of solid oxide fuel cells for large stationary power applications. The invention includes the definition of the sub components necessary to implement the invention.

2. Description of the Prior Art

High temperature solid oxide electrolyte fuel cells (SOFC) have demonstrated the potential for high efficiency and low pollution in power generation. Successful operation of SOFCs for power generation has been limited in the past to temperatures of around 1000° C., due to insufficient electrical conduction of the electrolyte and high air electrode polarization loss at lower temperatures. U.S. Pat. Nos. 4,490,444 and 5,916,700 (Isenberg and Ruka et al. respectively) disclose one type of standard, solid oxide tubular elongated, hollow type fuel cells, which could operate at the above described relatively high temperatures. In addition to large-scale power generation, SOFCs which could operate at lower temperatures would be useful in additional applications such as auxiliary power units, residential power units and in powering light-duty vehicles.

At the outset, it should be noted that due to the interplay of components and multiple views in various figures, there will be some shifting between figures, to better understand the prior art and the invention. Solid oxide electrolyte fuel cell (SOFC) generators that are constructed in such a way as not to require an absolute seal between the oxidant and the fuel streams, and presently use closed ended fuel cells of circular cross section, are shown in FIG. 1 of the drawings, with the closed end at the base of the SOFC Generator as shown in FIG. 5 of the drawings. Air flows inside the tubes on the cathode and fuel flows outside on the anode. The reaction of the fuel at the anode involves relatively pure fuel, for example, a mixture of hydrogen and carbon monoxide. To provide such fuel, feed natural gas can be catalytically reformed using, for example, nickel at a variety of locations, such as outside the SOFC generator or even, in-situ on the anode, as taught by Somers et al. in U.S. Pat. No. 4,374,184. On the other hand, air passes through a ceramic feed tube, exits at the end of a ceramic cell and reverses flow to diffuse through the inner fuel cell ceramic air electrode. Generally, the air is preheated by an exterior preheater or by an interior recuperator near a combustion area, such as described by Makiel in U.S. Pat. No. 4,520,082 and Draper et al. in U.S. Pat. No. 7,320,836. In these cells, interconnection, electrolyte and fuel electrode layers are deposited on an extruded and sintered lanthanum manganite air electrode tube by plasma spray or other techniques. In one embodiment, a lanthanum chromite interconnection is in the form of a narrow strip that runs axially over the entire active length of the air electrode tube; a yttria stabilized zirconia solid electrolyte is deposited in such a way as to almost entirely cover the air electrode tube, where this yttria stabilized zirconia does not become an active electrolyte until a temperature over about 700° C. is achieved in the fuel cell; and the electrolyte layer contacts or overlaps the edges of the interconnection strip leaving most of the interconnection exposed. Because the interconnection and electrolyte layers are dense, an overlap feature can provide a seal that prevents high temperature leakage of fuel.

In this embodiment, a nickel/yttria stabilized zirconia cermet, fuel electrode anode layer is deposited in such a way as to almost entirely cover the electrolyte, but leaves a narrow margin of electrolyte between the interconnection and the fuel electrode, where this margin prevents shorting of the cell; and series electrical connection between cells is accomplished by means of a structure made from nickel mesh, or, more recently, nickel foam and nickel screen, as shown in U.S. Pat. No. 7,157,172 B2 A1 (Draper et al.). The foam part of the connection becomes sintered to the interconnection while the screen part becomes sintered to the fuel electrode of the adjacent cell. Problems associated with the tubular cell, are limited power density, long current path, and potential bowing along its length during and after sintering.

Another cell geometry has been disclosed or patented in which the lanthanum manganite air electrode has the geometric form of a number of integrally connected elements of triangular or "delta" like cross section, see FIG. 2 of the drawings. These triangular, elongated, hollow cells have been referred to in the prior art in some instances as Delta X cells where Delta is derived from the generally triangular shape of the elements and X is the number of elements. These type cells are described for example in basic, Argonne Labs U.S. Pat. No. 4,476,198; and also in U.S. Pat. No. 4,874,678; U.S. Patent Application Publication U.S. 2008/0003478 A1, and International Publication No. WO 02/37589 A2 (Ackerman et al., Reichner; Greiner et al., and Thomas et al. respectively). An encyclopedic publication by N. Q. Minh, in "Ceramic Fuel Cells", *J. Am. Ceramic Soc.,* 76 [3] 563-588, 1993 describes in detail a variety of fuel cell designs, including the tubular and triangular and other types, as well as materials used and accompanying electrochemical reactions.

Generally, in newer triangular, tubular, elongated, hollow cross-section, so called delta or Delta X cells, the resulting overall cross section has a flat face on the interconnection side and a multi-faceted triangular face on the anode side. Air-flows within the internal discrete passages of triangular shapes where, at the end of the cell, the air can reverse flow to diffuse through the porous air electrode if air feed tubes are used. In the Greiner et al. publication, providing cell end closure, above, a transverse channel is used to cause reverse flow so air passes down one channel and up an adjacent one so air feed tubes can be eliminated. The fuel channels are built into multiple adjacent units of the triangular tubular type cells, and provide better fuel distribution and equal cross-section of air and fuel channels.

In the triangular tubular, elongated, hollow, so called delta or Delta X cells, a dense lanthanum chromite interconnection covers the flat face. A yttria-stabilized zirconia electrolyte usually covers the multifaceted triangular face and overlaps the edges of the interconnection but leaves most of the interconnection exposed. A standard nickel/yttria stabilized zirconia fuel electrode usually covers most of the electrolyte but leaves a narrow margin of electrolyte between the interconnection and the fuel electrode. Series electrical connection between cells can be accomplished by means of a flat nickel felt or nickel foam pads, one face of which is sintered to the interconnection while the other face is sintered to apexes of the triangular multifaceted fuel electrode face of the adjacent cell. This felt or foam also aids in combination cell-to-cell connector thermal expansion control properties.

Most of these designs utilize ceramic air feed tubes, which present their own set of issues, since it is difficult to manufacture long, completely round and straight ones. This in turn can create problems of binding when insertion into the air feed channel of the cells is attempted.

Because of their large active area, triangular, elongated, hollow, seal-less cells, shown in FIG. 2, operate at higher current than cylindrical cells and stack packing density is improved. Relative to cylindrical cells, triangular tubular cells achieve less ohmic resistance, therefore cell voltage can be closer to theoretical Nerst potential; however, tubular fuel cells are easier to manufacture, are more robust and both are useful in the current inventive design. The triangular, elongated, hollow cell, in particular, because of its thin triangular cross-sectional configuration poses particular difficulties in sealing, at open ends, and in providing transverse recirculation gas extraction.

Other tubular, elongated, hollow fuel cell structures are described by Isenberg in U.S. Pat. No. 4,728,584—corrugated design, and in U.S. Patent Application Publication U.S. 2008/0003478A1 by Greiner et al.—triangular, quadrilateral, oval, stepped triangle and a meander; all herein defined as "hollow elongated tubes". FIG. 3 describes a hybrid transitioned fuel cell with a flattened open non-active cross section and a triangular (Δ cross-section) merged and, morphed onto each, another SOFC design possibility, as described in U.S. application Ser. No. 12/169,261, filed on Jul. 8, 2008.

U.S. Pat. No. 6,656,623 (Holmes et al.) illustrates, in FIG. 5 of this application, a standard SOFC configuration with closed end down fuel cells and oxidant entry through the top of the generator, as has been the case since the basic Isenberg concept of U.S. Pat. No. 4,490,444, and is still the state of the art. Also, more clearly shown is a cut-away section of one fuel cell showing the end of the cell and an air feed tube. At the top of the fragile ceramic fuel cells, heavy exhaust ducts and air inlet plenums feeding to oxidant feed tubes are shown, all requiring very substantial support to not harm the closed end down SOFC tubes. The same is particularly true with U.S. Pat. No. 4,664,986 (Draper et al.), where massive metal overhead conducts are taught. U.S. Pat. No. 5,741,605 (Gillett et al.) illustrates a massive top weight oxidant distribution assembly on top of the bundles, and a massive oxidant inlet channel at the top of the SOFC stack.

Also, U.S. Pat. No. 4,801,369 (Draper et al.) teaches an apparatus having SOFC operating in a mode where the fuel cells are taught closed end up, at the top of the generator, and open end down, but the cells are operated by applying electricity to electrically dissociate water into $H_2$ and $O_2$. Here, electrons are not generated as in the SOFC mode, but are fed to generate $O_2$ in an electrolyzer mode—which is the exact opposite of a fuel cell mode where electrons are generated. In Draper et al., $O_2$ is discharged as the main product via a duct at the bottom of the generator, rather than providing air or $O_2$ in to be reacted within the fuel cell to exit as depleted oxidant, steam is added at the bottom of the generator as well as through a line (not shown) at the bottom of the generator. This pure steam flow is added to provide a buffer zone or seal between oxygen and hydrogen regions. Also, in addition to gas seals, Draper et al. did not address thermal expansion of large units. Electricity input between electrodes causes the steam to dissociate into $H_2$ and $O_2$. This is non-equivalent in any sense to providing $H_2$ and $O_2$ to provide electricity.

U.S. Pat. No. 7,364,812 (Taylor and Zymboly) also utilize inverted fuel cells, but in a SOFC mode, shown in FIG. 8. There fuel is reformed in special fuel feed tube assemblies involving feed fuel reverse flow to contact interior nickel catalyst, rather than free flow from entry plenum to fuel cell outside surface. Three horizontal seal locator/plenum separation strips are utilized to connect to adjacent bundles.

Reiterating, solid oxide electrolyte fuel cell (SOFC) generators usually include a gas-tight, thermally insulated external container which houses individual chambers including a fuel cell chamber and a combustion chamber. The fuel cell chamber, in which power generation occurs, contains a solid oxide fuel cell stack which is made up of an array of series-connected solid oxide fuel cells, with associated fuel and air distribution means. The solid oxide fuel cells contained in the generator chamber can take on a variety of well known configurations, including tubular, flat plate, and corrugated or delta, etc. designs.

More specifically, FIG. 1 shows a prior art hollow elongated tubular solid oxide fuel cell 10, which operates primarily the same as the other designs that are discussed later but will be described here in some detail, because of its simplicity, and because its operating characteristics are universal and similar to both flattened and tubular, elongated hollow structured fuel cells such as triangular and delta SOFC's. Most components and materials described for this SOFC will be the same for the other type fuel cells shown in the subsequent figures. A preferred SOFC configuration has been based upon a fuel cell system in which a gaseous fuel F, such as hydrogen and carbon monoxide derived from reformed pipeline natural gas, is directed axially over the outside of the fuel cell, as indicated by the arrow F. A gaseous oxidant, such as air or oxygen O, is fed preferably through a hollow air/oxidant feed tube, here called air feed tube 12, concentrically positioned within the annulus 13 of the fuel cell, and extending near the closed end of the fuel cell (not shown, but closed end seen in FIG. 5 at 92), and then out of the air feed tube back down the fuel cell axially over the inside wall of the fuel cell, while reacting to form depleted gaseous air or oxygen, as indicated by the arrow O' as is well known in the art.

Returning to FIG. 1, the prior art solid oxide fuel cell shown comprises a hollow elongated tubular air electrode 14 (or cathode). The air electrode 14 may have a typical thickness of about 1 mm to 3 mm. The air electrode 14 can comprise doped lanthanum manganite having an $ABO_3$ perovskite-like crystal structure, which is extruded or isostatically pressed into tubular shape or deposited on a support structure metal or ceramic and then sintered.

Surrounding most of the outer periphery of the air electrode 14 is a layer of a dense, solid electrolyte 16, which is gas tight and dense, but oxygen ion permeable/conductive, typically made of calcia- or yttria-stabilized zirconia. The solid electrolyte 16 is typically about 0.001 mm to 0.1 mm thick, and can be deposited onto the air electrode 14 by conventional thin film deposition techniques such as EVD or plasma spray.

In the prior art design, a selected radial segment 20 of the air electrode 14, preferably extending along the entire active cell length, is masked during fabrication of the solid electrolyte, and is covered by a interconnection 22, which is thin, dense and gas-tight and provides an electrical contacting area to an adjacent cell (not shown) or to a bus bar power contact (not shown). The interconnection 22 is typically made of lanthanum chromite ($LaCrO_3$) doped with calcium, barium, strontium, magnesium or cobalt. The interconnection 22 is roughly similar in thickness to the solid electrolyte 16. An electrically conductive top layer 24 typically nickel plating is also shown.

Surrounding the remainder of the outer periphery of the tubular solid oxide fuel cell 10, on top of the solid electrolyte 16, except at the interconnection area, is a fuel electrode 18

(or anode), which is in contact with the fuel during operation of the cell. The fuel electrode 18 is a thin, electrically conductive, porous structure, typically made of nickel-zirconia or cobalt-zirconia cermet approximately 0.03 mm to 0.1 mm thick. As shown, the solid electrolyte 16 and fuel electrode 18 are discontinuous, with the fuel electrode being spaced-apart from the interconnection 22 to avoid direct electrical contact.

Referring now to FIG. 2, a prior art, very high power density solid oxide fuel cell stack is shown. The cells are triangular solid oxide fuel cells 30. Here the triangular air electrode 34 has the geometric form of a number of integrally connected elements of triangular cross section. The air electrode can be made of lanthanum manganite. The resulting overall cross section has a flat face on one side and a multifaceted face on the other side. Air O flows within the discrete channels of triangular shape as shown. An interconnection 32 generally of lanthanum chromite covers the flat face. A solid electrolyte covers the multifaceted face and overlaps the edges of the interconnection 32 but leaves most of the interconnection exposed. The fuel electrode 38 covers the reverse side from the flat face and covers most of the electrolyte but leaves a narrow margin of electrolyte between the interconnection and the fuel electrode. Nickel/yttria stabilized zirconia is generally used as the fuel electrode which covers the reverse side. Series electrical connection between cells is accomplished by means of an electrically conductive top layer 35 of flat nickel felt or nickel foam combination pads one face of which is sintered to the interconnection while the other face is sintered to the apexes of the triangular multifaceted fuel electrode face of the adjacent cell. An example of a dimension is width 36, about 150 mm and cell plate thickness—about 15 mm. This triangular cell design is active throughout the entire length spanning the interconnection. Fuel is shown as F.

FIG. 3 illustrates a hybrid transitioned solid oxide fuel cell 40 having a triangular, active length 44 having a triangular active cross-section. The inactive cross-section 46 has flattened parallel sides 48, as shown. One out of eight hollow air feed tube 49 is also shown.

Refer now to FIG. 4, which is a standard triangular delta cell, where inlet air is in counter flow mode to outlet air, and which better illustrates the operational aspects of a delta cell. Solid oxide fuel cell 40 has a full triangular active length 44 with a triangular active cross-section. This triangular active cross-section contains a bottom interconnection 45 as well as an air electrode, fuel electrode, interconnection and solid oxide electrolyte therebetween. Channels 62 in the open-face will all contain hollow air feed tubes 49, although one is only shown for sake of simplicity.

Fuel F passes between and outside the triangles as at 65 contacting a fuel electrode on the active outside side of the triangles to provide reacted spent fuel 66 which passes through the separation between adjacent fuel cells. A separate triangular sintered end piece 72 is also shown.

Process air O is fed into the air feed tube 49 and passes to the closed end 74 where it reverses flow, passing upwards in the annular space between the cell cathode and the air feed tube back through the air passage, as shown, while contacting the air electrode within the channels to provide depleted air stream 76 which exits at the open end of the cells, enters a combustion zone (not shown) and reacts with spent fuel.

Referring now to generator prior art FIGS. 5 and 6, prior art design placed very heavy components on top of the fuel cellstack. FIG. 5 (Holmes et al., U.S. Pat. No. 6,656,623—FIG. 2) illustrates, as of its issue date of 2003, standard fuel cell generator structure with a massive insulation board components 86, air inlet plenum 82 with top air O feed 84, air feed tube support board 87 and composite, sliding fuel cell seal and positioning gasket 88, all supported generally by the fuel cells or peripheral components. Also shown are bottom insulation board 86' as well as bottom fuel distribution boards 90. As shown, SOFC fuel cell bundles are closed end down, 92 showing the closed end, with air feed tubes 94 extending to the bottom of the cell. Fuel F enters at the bottom of the generator as shown.

Also, FIG. 6 (Gillett et al., U.S. Pat. No. 5,741,605—FIG. 3) illustrates, as of its issue date of 1998, prior art fuel cell generator structure 100 with removable module SOFC module stacks, with interior insulation boards 104 and 108. The generator 100 has top oxidant distribution assembly 111 within oxidant plenum 114, certainly massive structures, with equally massive top oxidant inlet 112, all on top of the SOFC area 121, with fuel plenum 116 at the bottom. Interior reformer and recirculation loop are shown as 113.

Now referring to FIG. 7 (Draper et al., U.S. Pat. No. 4,801,369—FIG. 1) illustrates, an unusual design of interconnected solid oxide electrolyzer tubes 125 in an electrolyzer 120 in container 122, where each tube is sealed at the top with a ceramic cap 110 and is open at the bottom, with side power leads 115. Steam feed passes into header 118 to distribution chamber 119 between ceramic boards 130 and 131. Holes in the plates allow steam ($H_2O_{(g)}$) to pass into reaction space 124. Input D.C. power is applied to the anodes and cathodes of the electrolyzer tubes where oxygen is formed inside the electrolyzer tubes 125 passing down chamber 132 and is discharged through header 117. Hydrogen formed is passed out exhaust header 128. This apparatus, completely the opposite of solid oxide fuel cells, adds electricity to dissociate steam ($H_2O_{(g)}$) into $H_2$ and $O_2$ and generates no power. It is a reverse fuel cell with added steam 126 acting as a gaseous separator between oxidant and fuel. This design does not address modularity, does not show how to support cell weight and as a whole lacks provision for internal thermal expansion in any direction.

FIG. 8 (Taylor and Zymboly, U.S. Pat. No. 7,364,812—FIG. 2A) is an inverse fuel cell design with internal fuel reformation assemblies 150 surrounding the fuel cells. Spacer plates 152, 154, 156, 158 and alignment pins 160, 162, 164 form the support structure. The inverted hollow tubular fuel cell 166 contains hollow air feed tube 168. Fuel F enters at opening 170, passes into fuel supply manifold 172 and flows down and reverse flows up reformation assemblies 150 to become reformed fuel F'. Catalysts within reformation assembly 150 can reform feed natural gas. Seal locator strips 174 are used to connect adjacent fuel cell bundles. Air is shown as O with arrows showing its flow patterns. This design does not allow for controlled thermal expansion between bundles during operation, and the internal reformation assemblies take up at least 20 vol. % of the SOFC cross-section and prevents close contact of fuel cells for efficient packaging and electrical distribution. There is no suggestion of reformation in situ on the cell.

All these prior art generator figures are provided to illustrate the current state of the art, and so they, in instances of FIGS. 5-8, can be distinguished from invention of FIGS. 9-15.

As described above, there is a long felt need for a solid oxide fuel cell module and stack design that can compete as an energy source in real world situations, and work in large generators having module bundle rows of up to or exceeding ten bundles. Many have provided proof-of-concept pilot processes where costs are unrealistic in a commercial market. What is needed is a dramatic redesign and rethinking of how the entire to date SOFC generator operates. It is a main object of this invention to provide a departure from previous prototypical, costly, generally non-commercial designs. It is another object to provide a cost effective design for commercial SOFC that has to have revolutionary rethinking to dramatically reduce costs and improve SOFC generator internal volume electrical generation.

SUMMARY OF THE INVENTION

The above needs are supplied and objects accomplished by providing a solid oxide fuel cell module comprising: a plurality of integral bundle assemblies, each integral bundle assembly comprising: a top portion containing an inlet fuel plenum and a top metallic slidable/sliding pin to accommodate axial thermal expansion, a bottom portion receiving air inlet feed and containing a casting formed as a ceramic air exhaust manifold which casting in plural form provides an air exhaust plenum, which casting also provides a receptacle for an air inlet box and air feed tubes, to receive bottom air inlet feed, where said air feed tubes pass from the air inlet box into the center of inverted, tubular, elongated, hollow electrically connected solid oxide fuel cells, said fuel cells having an open end through which the air feed tubes pass and a closed end near the inlet fuel plenum, said fuel cells providing fuel cell bundles; the bundle assemblies surrounded by an outer module container having power leads passing through a reducing fuel environment, where the fuel cells operate in the fuel cell mode, where the bottom ceramic air exhaust manifolds carry the internal weight of the fuel cell bundles, where the ceramic exhaust manifold includes bottom ceramic legs which provide a central axis with the top slidable pin to provide each integral bundle assembly with a vertical axis thermal expansion center and where the interior of the container houses primarily electrically generating components. The top metallic pin is preferably attached to the top interior of the container and the pin can slide within the top portion of the integral bundle assembly. Preferably, the exhaust manifold rests on a base support. Also, a portion of the exterior of the fuel cells, near the closed fuel cell ends, controls the speed of reformation reactions and thus controls the reforming of entry fuel, in-situ, on the fuel cell, saving interior volume and eliminating separate reforming tubes and other means apart from the fuel cell itself.

The invention also resides in, more specifically, a solid oxide fuel cell module comprising a plurality of vertical elongated electrically and physically connected integral bundle assemblies forming a stack, each stack containing a plurality of integral bundle assemblies comprising: a top portion containing an inlet fuel plenum and a top metallic sliding pin, which is slidable within the top plate of the assemblies, to accommodate assembly axial thermal expansion and a bottom portion receiving air inlet feed and containing a metallic base support which supports a dense, molded casting formed as a ceramic air exhaust manifold, which in plural, forms/provides an air exhaust plenum which air exhaust plenum is below and communicates/provides a receptacle for inlet air feed tubes, to receive bottom air inlet feed, the exhaust manifold located below an internal heat recuperator, said air feed tubes passing into the center of inverted, tubular, elongated, hollow electrically connected solid oxide fuel cells having an open end above the recuperator through which the air feed tubes pass and a closed end near the inlet fuel plenum, said fuel cells comprising a fuel cell stack bundle; all surrounded within an outer module container having power leads passing through the container in a reducing fuel environment to provide electrical output from the stack, where the fuel cells operate in the fuel cell mode and where the base support and bottom ceramic air exhaust manifolds carry all the internal weight of the fuel cell bundles, where ceramic exhaust manifold bottom four point ceramic legs (keyways) resting on the metallic base providing a central axis with the top sliding metallic pin to provide an integral bundle assembly thermal expansion center, where each integral bundle assembly is separated from adjacent bundle assemblies by at least one resilient, circumferentially disposed, ceramic band seal layer located between the recuperator and the fuel cells; all disposed in a case having exterior fuel feeds, air feeds and exhaust, so that the interior of the case contains primarily electrically generating components; with fuel bypass in the insulation between the container wall and peripheral insulation controlled by a barrier running from the container to the peripheral integral bundles at the approximate elevation of the combustion zone, delivering the bypass fuel to an area for combustion before leaving the module, with a lateral support running from the container to the peripheral integral bundles to provide support for lateral loads from the plurality of integral bundle assemblies.

This novel design solves problems of air and fuel delivery and distribution, axial and horizontal internal thermal expansion, recuperation of air flow, controlling fuel bypass, lateral support of the fuel cells, orientation of the fuel cells and providing defined, strong structural support for the fuel cells. This design utilizes high thermal shock 90 vol. % to 98 vol. % dense cast ceramics as a major support for the entire top structure of the generator. Preferably, they are freeze molded ceramic castings. Essential to maximize commercial value of this new design is the use of inverted fuel cells, in-situ reformatting of fuel on the fuel cell end, establishment of a sliding pin top and ceramic leg bottom to allow bundle assembly axial vertical expansion into a stationary pin which is slidable into the bundle assembly and use of circumferential band seal control of horizontal thermal expansion.

As used herein, the term "tubular, elongated, hollow" solid oxide fuel cells is defined to include: triangular, that is wave type; sinusoidally shaped wave; alternately inverted triangular folded shape; corrugated; delta; Delta; square; oval; stepped triangle; quadrilateral; and meander configurations, all known in the art. Also, the term "bundle" means a grouping of at least two fuel cells, "stack" means a group of integral bundle assemblies (such assemblies are shown as 502 in FIG. 12) having bundles (shown as 600 in FIG. 13 as a single row), a module (200 in FIG. 9) contains a stack, and a power plant is comprised in part by a group of modules.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
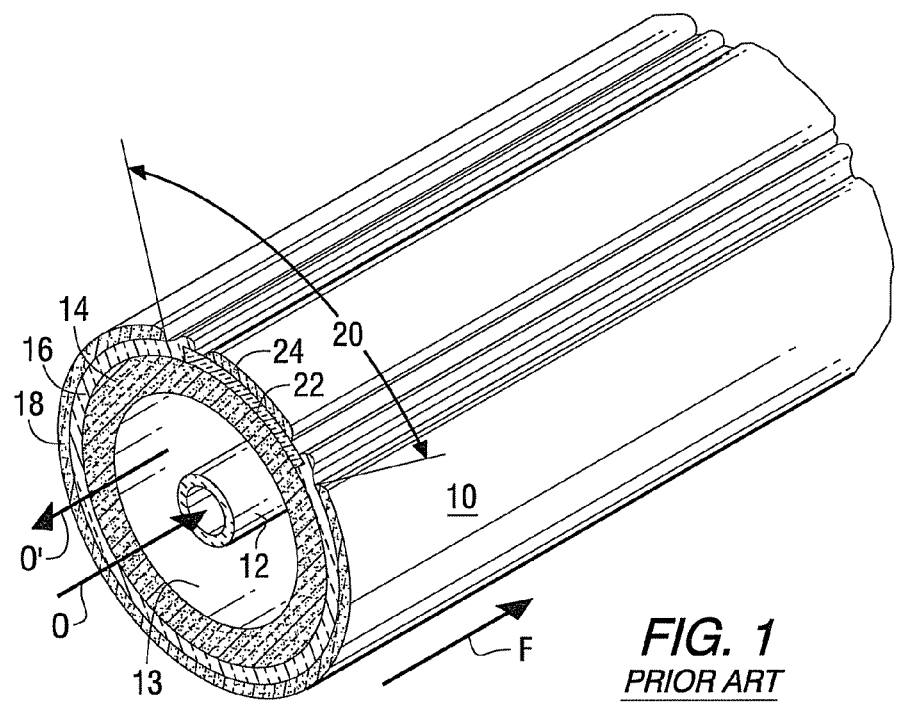
FIG. 1 is a sectional perspective view of one type prior art tubular solid oxide fuel cell showing an air feed tube in its center volume.
Figure 2:
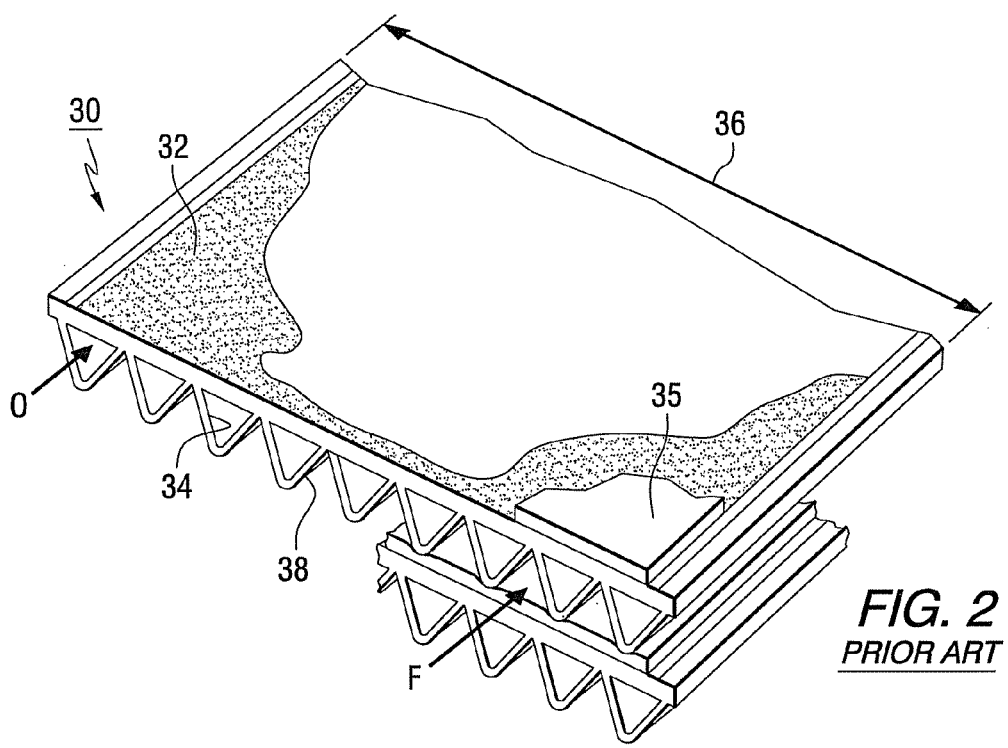
FIG. 2 is a sectional perspective view of one type prior art delta triangular type, solid oxide fuel cell of two sets of fuel cells, showing oxidant and fuel flow paths but not air feed tubes for sake of simplicity.
Figure 3:
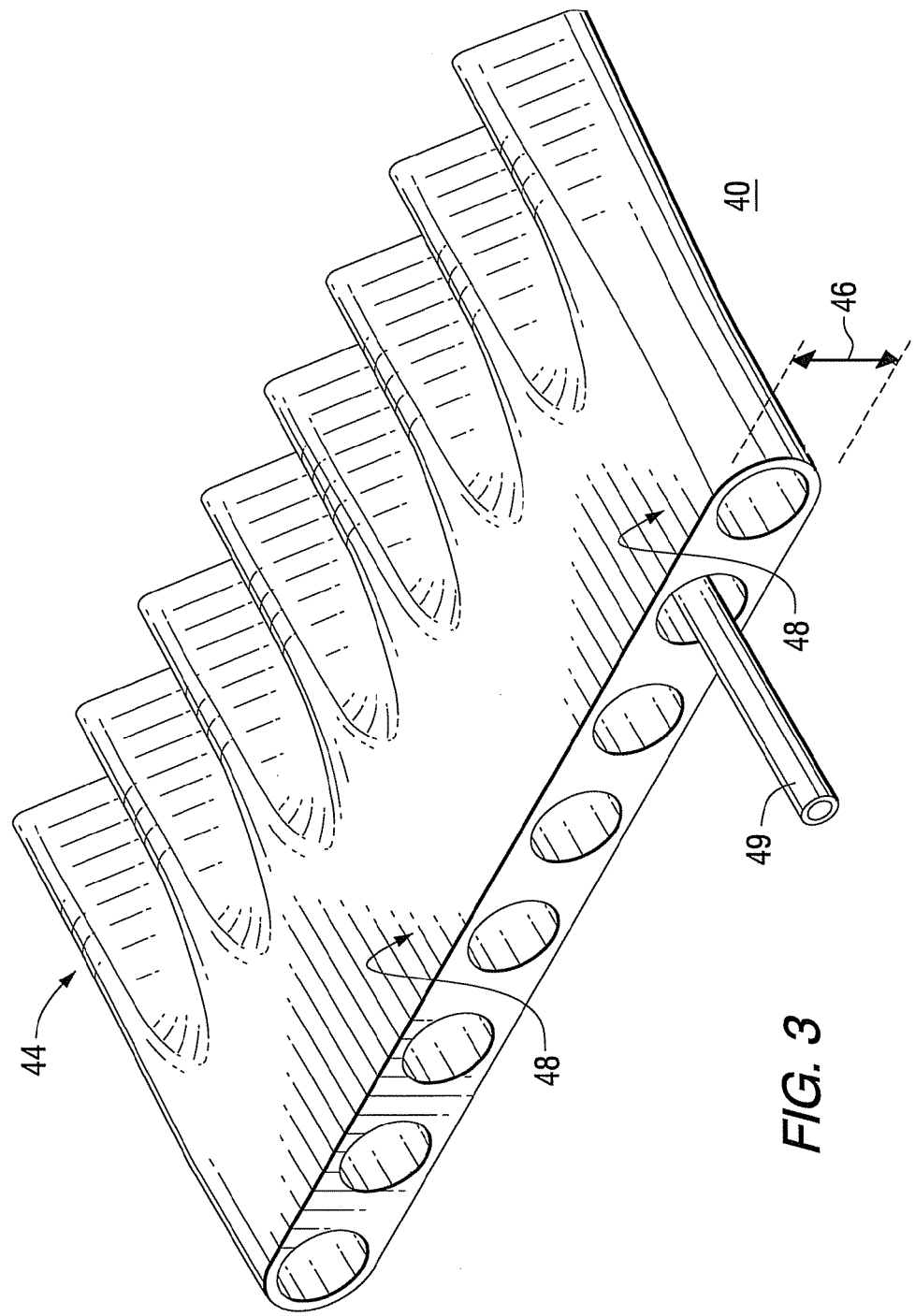
FIG. 3 is a foreshortened, three dimensional top view of a portion of a hybrid, transitioned fuel cell with a flattened open non-active cross-section and a delta/triangular active section merged into each other, where only one air feed tube is shown for sake of simplicity.
Figure 4:
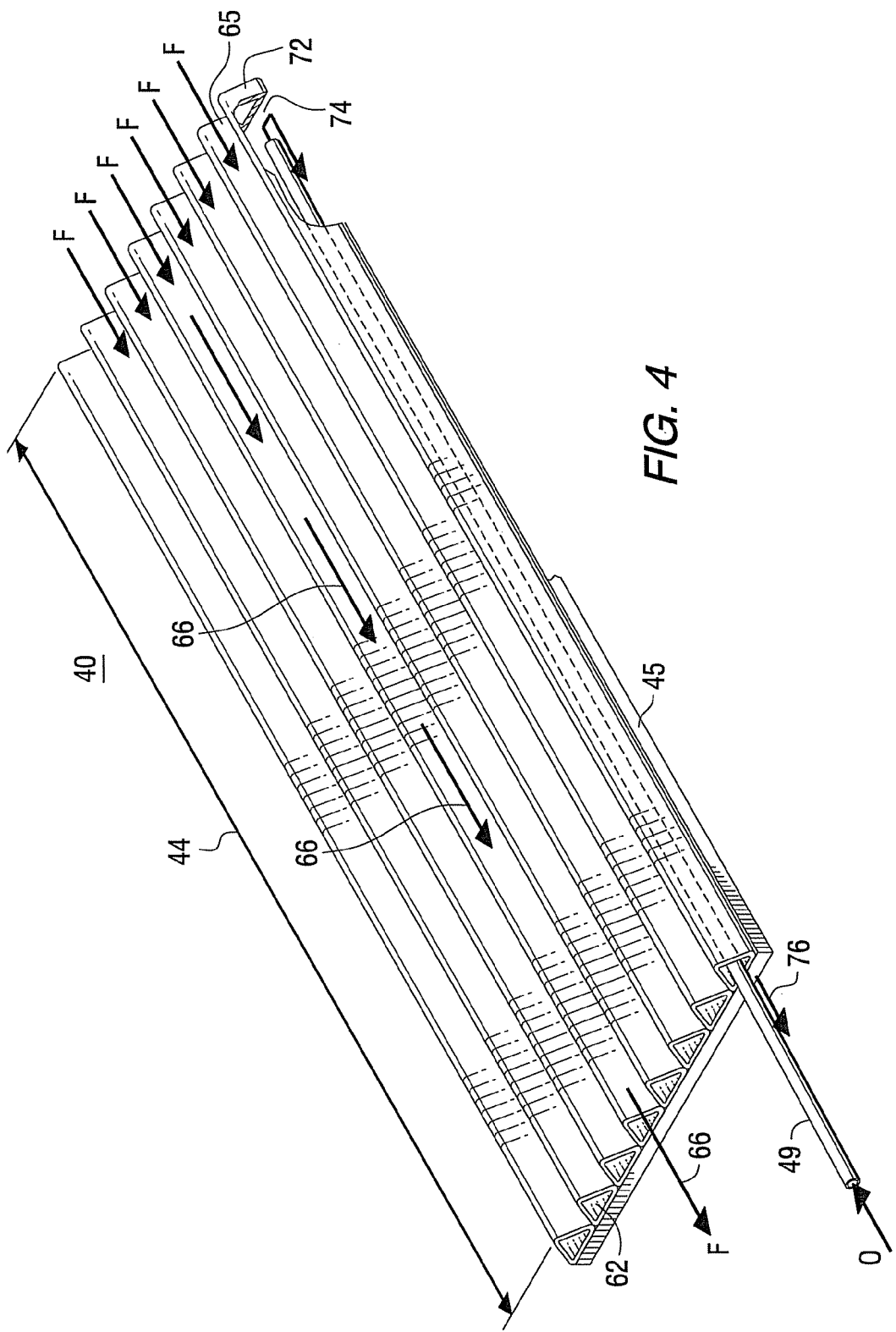
FIG. 4, which shows the operation of a delta/triangular fuel cell, is a sectional perspective view of a delta type solid oxide fuel cell showing air feed tube placement, with only one air feed tube shown for simplicity, and air/oxidant and fuel flows.

Referring now, having spent lengthy discussion on prior art operation and materials used in "tubular, elongated, hollow electrically connected" SOFC, particularly in tubular and Delta (delta) configuration, and additional discussion of various prior art embodiments of SOFC use in generators of various types all of which is important to understand this complicated invention; we now turn to the invention. The invention solves problems, not in operation or proof of concept, because SOFC's do work well and are non-polluting; but in how to make economical large size SOFC generators work commercially. How to make them real, useful, space efficient, low cost and to continue to be non-polluting—an ever important consideration. Their entire configuration, going back to basic Isenberg (U.S. Pat. No. 4,490,444) has been proof of design, but that did not yet make larger sizes viable as an energy competitor in the real world of nuclear power, gas turbine, and coal generated electricity.

The present invention relates to the arrangement, elimination and selection of components necessary to construct an array of solid oxide fuel cells for large stationary power applications. The invention includes the definition of the sub components necessary to implement the invention.

This invention is, in many instances, a departure from previous prior patent and published SOFC art. It fundamentally changes the entire arrangement of what has been previously presented as standard solid oxide fuel cell modules, well known in the art since 1983, for development and sale to their customers. This invention developed from the realization that previous approaches were unlikely to ever be ultimately cost effective. Any overall module architecture must have a design strategy and an implementation of a design solution for each of the fundamental design problems associated with a large solid oxide cell module (>100 kWe). An elegant solution in one area could easily result in a conflict with another design consideration, rendering the solution in the one area not as elegant.

The major areas that must be addressed in a large solid oxide fuel module include: air delivery and distribution; fuel delivery and distribution; control of fuel bypass burning locations and explosive hazards; starting and preheating the module to operational conditions; control of axial and horizontal internal thermal expansion; recuperation of air flow; orientation of the fuel cell within the module; maintaining separation of air and fuel within the module; differential motion at critical seal locations such as open end seals; providing defined strong structural support for the fuel cells; method of fuel recirculation; provisions to export power from the fuel cells at high temperature and amperage levels; approach to containment of the stack; amount, type and location of thermal insulation for the stack; selection of viable materials consistent with temperature, environment, and cost; ability to significantly increase the physical size and power rating of the unit with a minimum technical extrapolation and added cost for either first time engineering or retooling in manufacture; prevent air by pass to exhaust air; and approach for assembly and repair.

Although there are many approaches to each of these considerations, it is found that the number of practical complete module configurations is limited by conflicts with other requirements. This invention provides significant advantages over the existing art. It is believed that a cost effective solid oxide fuel module will most likely have this arrangement.

This inventive configuration is motivated to reduce the overall cost of the individual modules and stack internals. This was achieved by recognizing some of the cost drivers in the previous designs and fundamentally changing the paradigm to reduce these factors. A cost effective SOFC module must be efficiently packaged so their plurality in a power generation plant is efficient. Wasted space in the stack bundle volume reduces cell count in a given volume. This volume, to provide an appropriate operating environment for a solid oxide fuel cell, is expensive. This means the module must be structurally efficient. Any volumes not used which result in the wasted space must be filled with something expensive, usually high purity insulation board in existing modules. Internal functions of the module must be well integrated.

The use of high purity, 99% pure $Al_2O_3$, insulation board as a structural material needed extensively in prior art to obtain prior art designs, has been very significantly reduced. This high purity board material is very expensive. It can approach the cost of the cell on an enclosed volume basis. Further, the boards always require machining which adds to the cost. Boards are quite fragile and result in significant yield problems. When structural support is required from these boards, significant amounts of space is required because of the low permissible stress levels of these boards. A module architecture that uses a more efficient material is required.

This invention relies on a high technology type cast inorganic slurry based, fired ceramic, preferably freeze cast, inorganic slurry based, fired, extremely high temperature, extremely high thermal shock cast ceramic of 90 vol. % to 98 vol. % density having very strong interfacial bond layers, as taught by U.S. Pat. Nos. 4,428,895 and 4,569,920 (Blasch-Smith-Johannson, respectively). These cast alumina ceramic components provide the more efficient shapes needed to replace high purity insulation board with less expensive blanket material, which can now be used in most cases to replace high purity insulation board. These Blasch-Smith-Johannson type base castings are produced as a laminated or layered multi-ceramic material composed of different inorganic particles having different mass thermal coefficients of expansion, where each layer is essentially unmixed and frozen as layered slurries in a cooling media to form a layered unified casting having interfacial bonds to withstand temperatures of 1,000° C. without delamination, and excellent thermal shock resistance. Molds to cast the materials can be lubricated with mold release agents. Entrapped air is avoided by, for example, vacuum treatment techniques. After freezing, the castings are removed from the mold, thawed, dried and then fired in a kiln. These castings are herein defined as "plural freeze molded, castings". Inorganics that can be used include aluminas, silicas, magnesias, chromites, spinels and clays, and their mixtures, preferably alumina as taught in the above described Blasch-Smith-Johannson patents. This use of these castings limits use of high purity insulation board for dielectric insulation and minor filling function within the module.

Assembly costs of the existing prior art architectures are high and unacceptable. This is the result of significant custom fitting of major module components during assembly. Again, this is due in part to the difficulties in obtaining precision parts which are machined from insulation board. The shapes of the module must be simple because of this machining, which limits the possibility of making small multi-functional parts. Much of the assembly operations are series in nature and increase the overall assembly time. The series assembly operations can also create lengthy and expensive repair costs if the approach to repair is simply the reverse of the original assembly sequence. If insulation boards are used, disassembly for any reason can result in damage beyond repair.

It is clear that a different module structural material was required. Even if a more durable and less expensive structural board material were available, it would still be wasting precious volume within the module that could be used for cells. The following describes an overall design strategy used to develop the module configuration of this invention and solve the previously mentioned problems. Using these design strategies results in an architecture which is fundamentally different and is necessary to solve these problems.

First, in this invention, there is very little high purity structural board in the design. The load bearing members have been replaced with bottom air inlet plural freeze molded castings, preferably containing alumina. This affords a more compact efficient and cost effective design. The inherent precision in the molded castings permits parts, such as air inlet manifolds, to assemble directly together without additional labor, resulting in substantial cost savings. Multi-functional parts of uniform quality and low cost are possible.

Very importantly, the SOFC cell is oriented in an "inverted" mode, with the closed end up and open end down. This eliminates the need for the fuel distribution system to support the weight of the stack. This removes considerable insulation board as well any metallic structure required to support the entire stack, and more important, makes the open end seal a stationary seal rather than a sliding seal, which is less reliable. With the closed SOFC end up, the weight of the cell rests on cast air inlet manifolds and other components that ultimately form the base of the integral bundle assemblies and assembled module. These cast components are relatively heavy compared to the cells. With the cast components sitting directly on the base of the module, there is no need for either the cells or an additional structure to support these castings, if the cells were oriented with the closed end down. This is an important feature of this architecture because heavy cast ceramic components can be used without the need to load the cells or add structure to support these heavy components.

Figure 5:
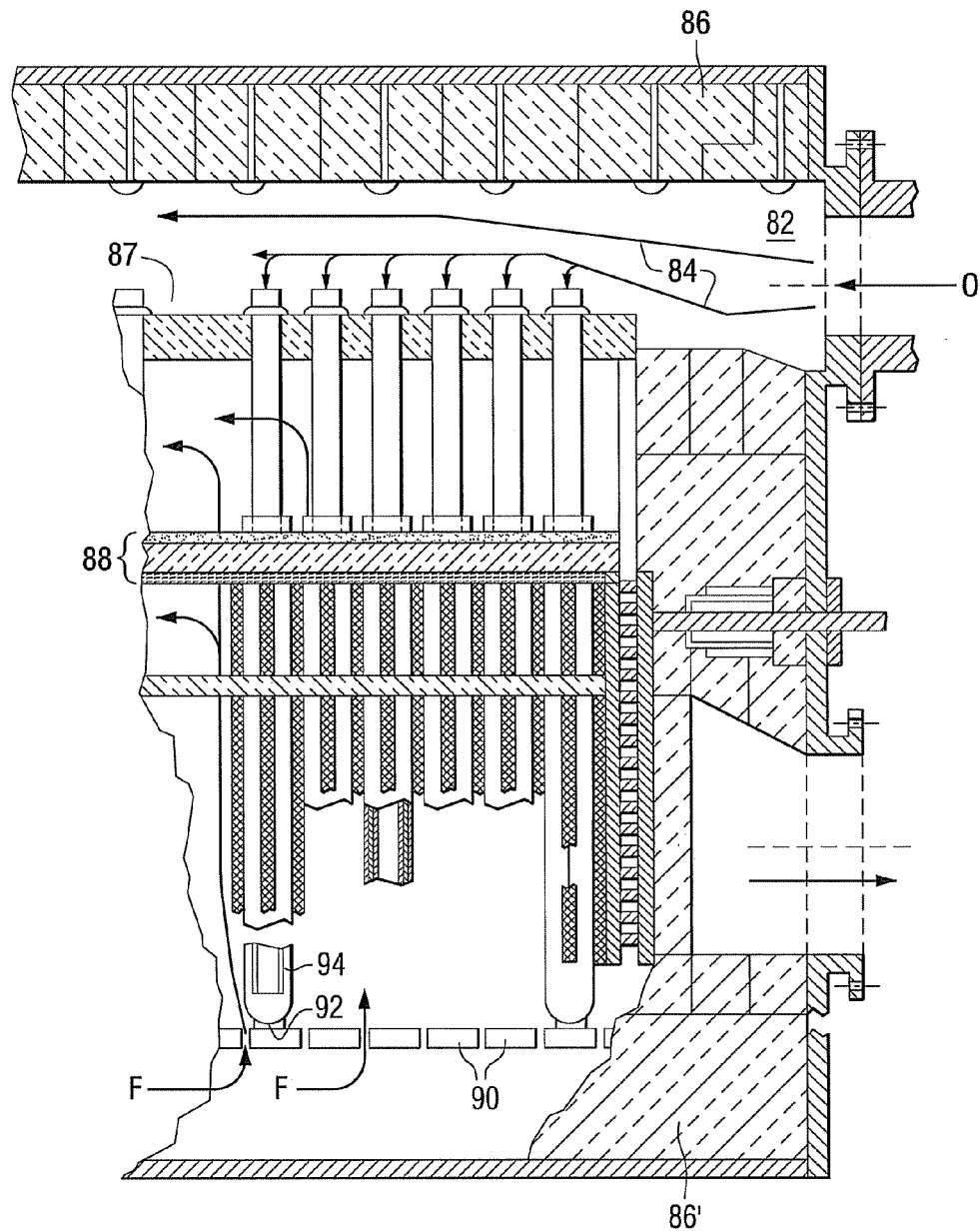
FIG. 5 is a side view section of a standard type prior art SOFC generator with fuel cells in normal closed end down, open end up architecture.
Figure 6:
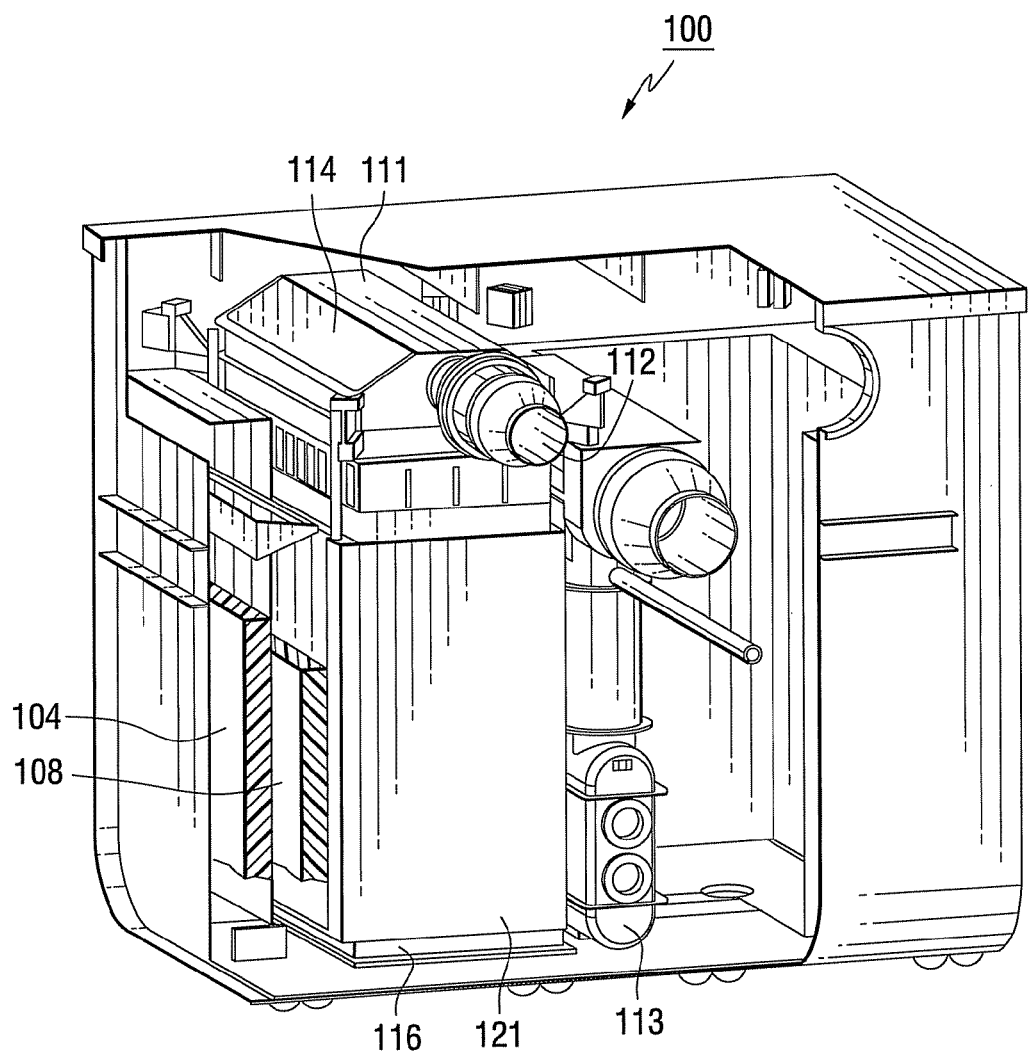
FIG. 6 is a cut-away view of a prior art SOFC generator and container showing massive top oxidant inlet channel, exhaust port channel, and interior reformer.
Figure 7:
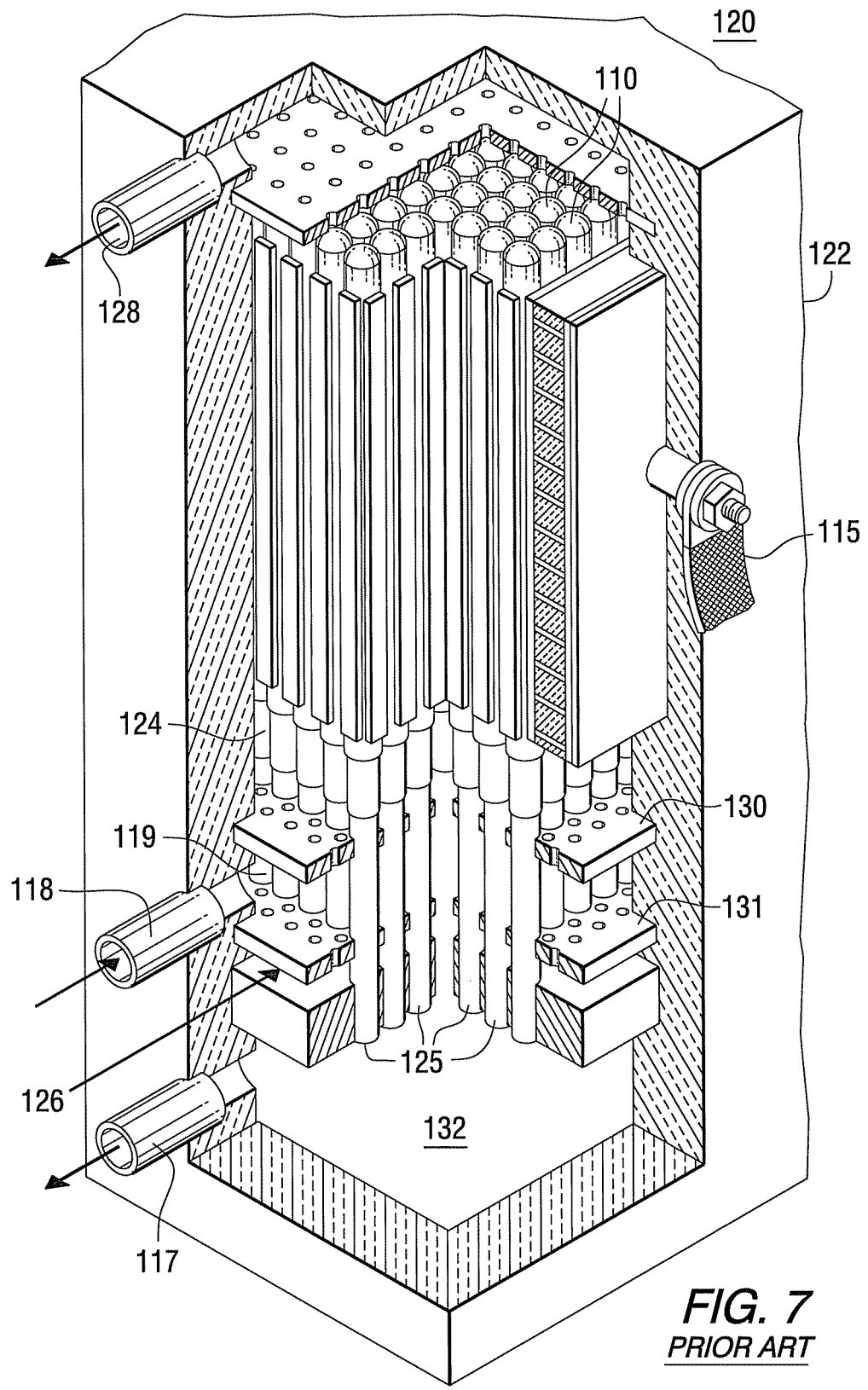
FIG. 7 is a cut-away view of a prior art electrolyzer, using inverted electrolyzer cells, which is fed electricity and which dissociates steam into oxygen and hydrogen.
Figure 8:
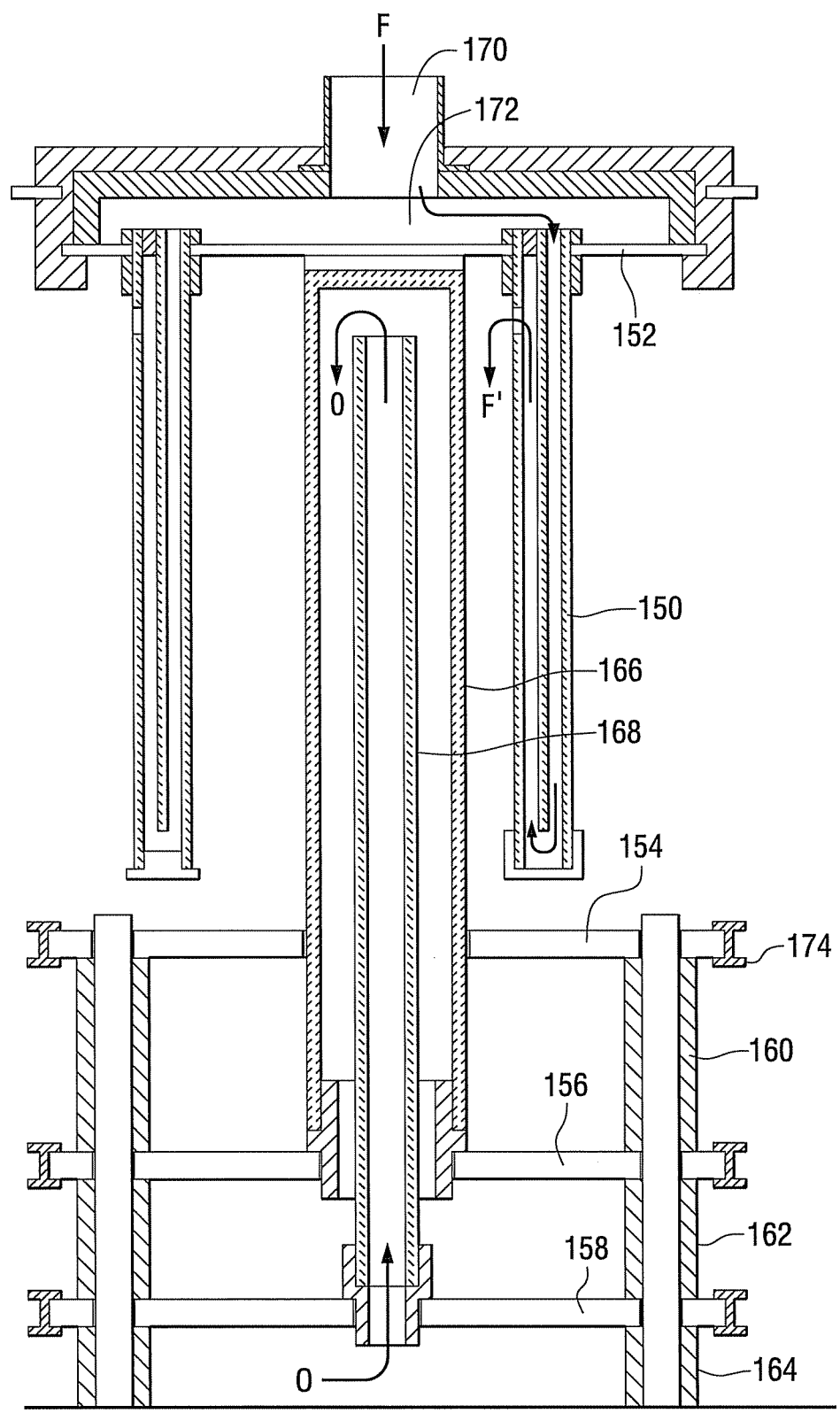
FIG. 8 is a cross-sectional view of a prior art fuel cell generator, using inverted fuel cells, and separate interior fuel reforming means.

This inverted design was an issue primarily because substantially all prior generators have had the closed end of the cell in the down position. This was done principally to aid in the assembly of the top positioning boards and seal/positioning gasket over tubular cell bundle rows. It has been assumed, for ease of assembly purposes, that boards could be slid over the open ends of the cells with the cells supported at the base, closed end in the down position. In practice, this past approach for the tubular cell had become more complicated. First, laser mapping of the cells was required for drilling the holes in the positioning boards. The relative axial sliding of the fuel cell tubes to the composite positioning gaskets (88 in FIG. 5) had been problematic. In many cases, the top boards cracked around the peripheral hole region due to axial thermal expansion and the laminate on the boards formed more or less a simple hinge. The introduction of the Delta type geometry made the seal around the open end even more difficult. The seal becomes even more difficult because the magnitude of compensation for mechanical tolerances and thermal expansion in the horizontal plane has greatly increased, in addition to having to provide for axial sliding of a non-circular profile. This makes an approach to sealing around the cell limited to some type of packing. Extensive sliding of perhaps 0.25 inch axial relative motion is undesirable and would decrease the lifetime of such an arrangement. For large modules it may not be possible to have a uniform seal of desired flow resistance with thermal expansion acting on such a seal. It would be preferable to have no axial sliding motion at the seal surface. This can be accomplished by fixing the open end of the cell and allowing the closed end to expand. This reduces the complexity of sealing around an irregular geometry. The cell closed end in the up position creates the opportunity for cost reduction. Here, the fuel plenum distribution region does not support the dead weight of the integral bundle assembly and internal components. This eliminates a substantial amount of structural high purity board found in previous designs. In addition, the cast components, which replace many of the structural board components in previous designs, can be directly supported by themselves to the base of the stack and thus avoiding the cost of providing support for these rather massive components and any potential for applying mechanical loads to the cells. Importantly, in closed end up fuel cells the only weight loads applied to the cells are weight loads generated internally solely by the cells. It has been discovered that this eliminates essentially all mechanical loads of the SOFC.

Figure 9:
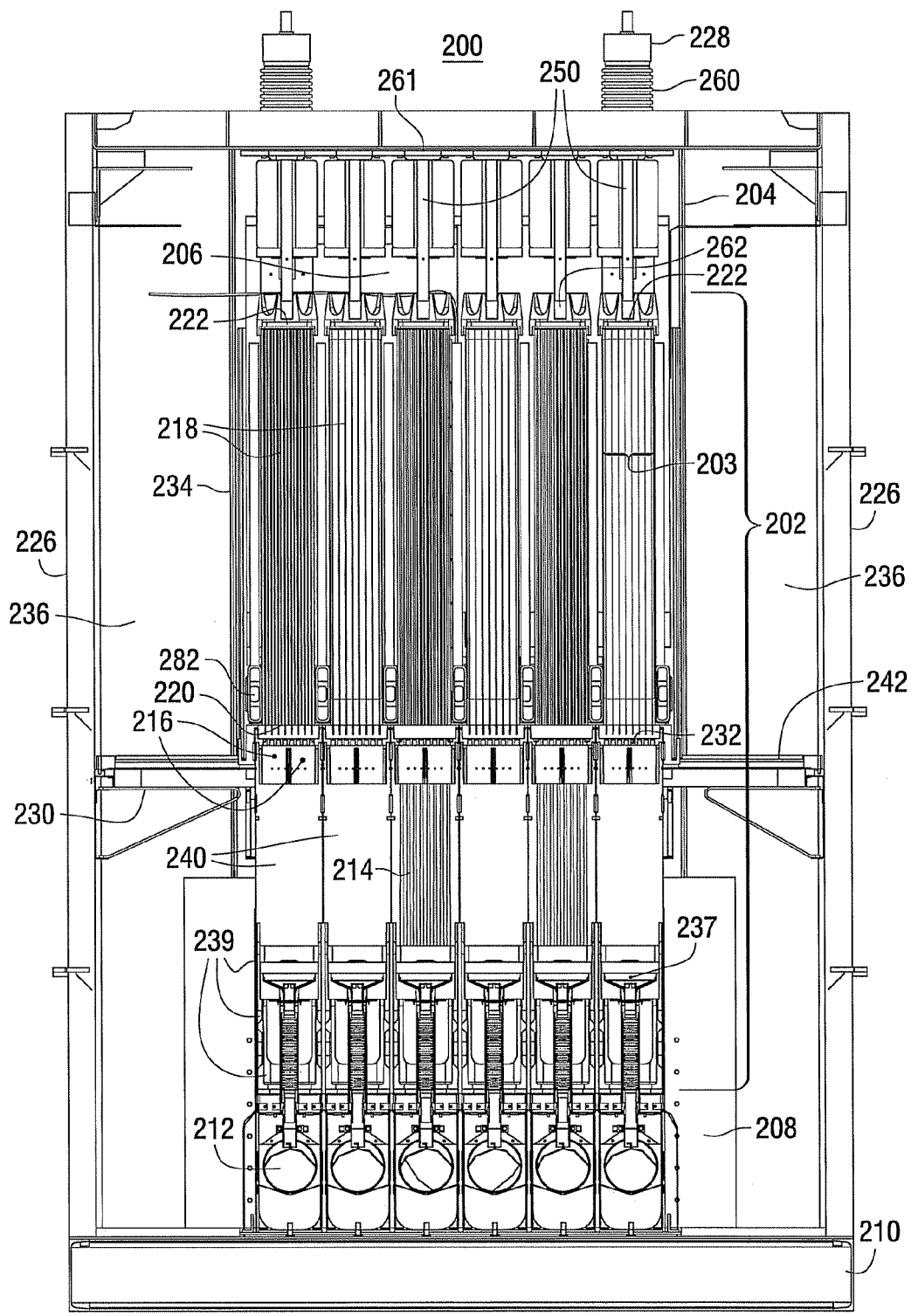
FIG. 9, is an elevational view of the generator architecture of this invention showing the "front" air inlet side of the SOFC generator.
Figure 11:
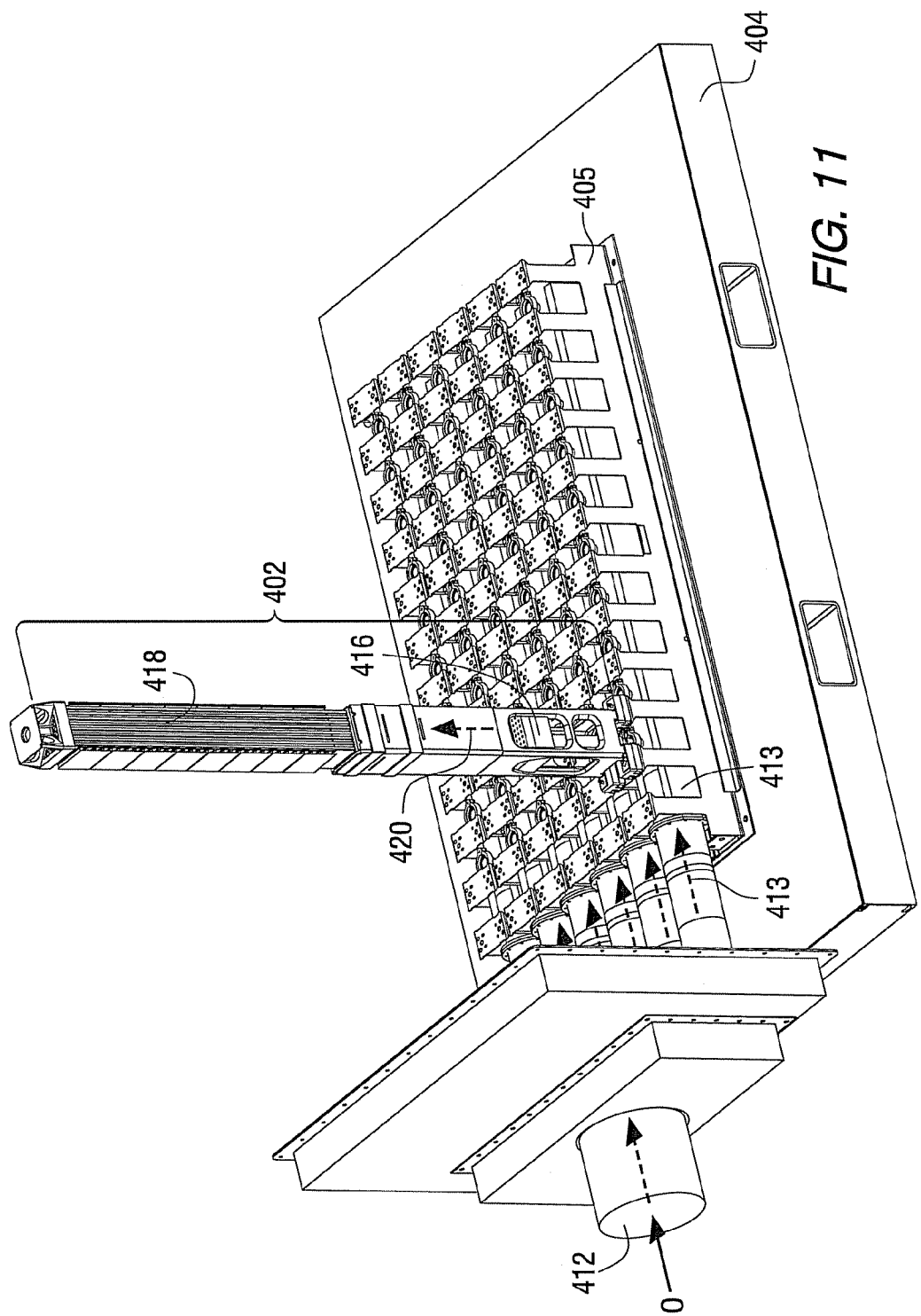
FIG. 11 is a simplified isometric view of the container base, the air inlet plenum, ceramic castings, and a single supported SOFC integral bundle assembly.
Figure 12:
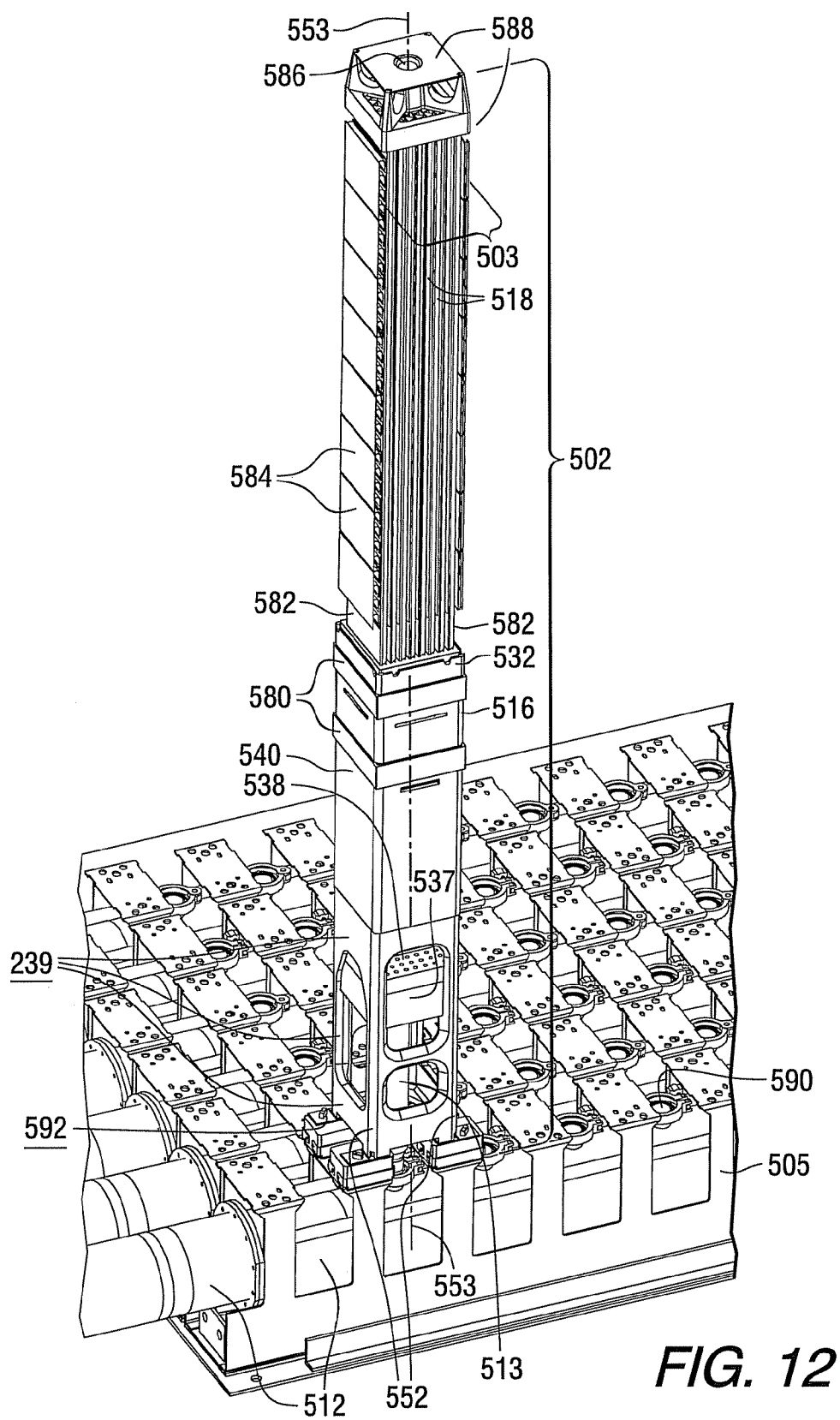
FIG. 12 is an isometric view of the SOFC module base air inlet manifolds and one integral bundle assembly and is a clear illustration of the invention.

In this new design, there is a single key component, integral, solid oxide fuel cell stack bundle assembly 202, 402, 502 in FIGS. 9, 11, 12, respectively, that is the fundamental element that forms the overall, stack located within a module. The integral fuel cell stack bundle assembly provides basic services for each group of hollow, tubular inverted solid oxide fuel cells, 218, 418, 518 in FIGS. 9, 11, 12, respectively, within the integral bundle assembly. This invention addresses how the array of integral bundle assemblies is aggregated to form a larger unit. This invention provides a separate thermal center for the mounting of each integral bundle assembly to limit horizontal absolute magnitudes of thermal expansion and accommodate vertical thermal expansion. This approach is scalable to quite large modules because the thermal expansion is controlled at the single bundle level. Horizontal thermal expansion is not allowed to accumulate beyond the small amount of a single bundle assembly. Therefore, the fundamental element can be tested and the extrapolation to a larger module is significantly easier. Relative horizontal thermal expansion motion between the stack and surrounding container is greatly reduced, by utilizing circumferential, soft fiber pads/compliant gaskets, best shown as 580 in FIG. 12, which significantly simplifies lateral support of the array of integral bundle assemblies and control of fuel bypass. In the design of the module, the individual integral bundle assemblies are assembled onto fixtures that are actually parts of the final module assembly. This eliminates considerable amounts of labor previously required to set up and remove fixturing during module assembly.

Referring now to the invention in more detail, as described in FIGS. 9 to 15. FIG. 9 shows a solid oxide fuel cell generator module 200 comprising a top portion 204 containing a top inlet fuel plenum 206 and a bottom portion. 208 sitting on a metallic base support 210. Air inlet manifolds are shown as 212. The air inlet manifolds 212, usually metallic, are below and communicate with an array of air boxes 237 which also communicate with air feed tubes 214. The air feed tubes pass through a combustion zone 216, said air feed tubes passing into the center of tubular, elongated, hollow electrically connected solid oxide fuel cells 218. The fuel cells 218 are tubular, elongated, hollow solid oxide fuel cells as defined previously and are grouped into bundles, shown, for example, as 203. The entire length of fuel cells, air feed tubes and castings are defined as integral bundle assembly 202. The fuel cells 218 have an open end generally shown as 220 above the combustion zone 216 into which the air feed tubes 214 pass, and a closed end generally shown as 222 near the inlet fuel plenum 206, said fuel cells comprising a plurality of fuel cell stack bundles 203, all surrounded within an outer metallic generator container 226. The top end of the power lead 228, which can have a bottom bellows structure 260, extending from a bus bar (630 in FIG. 13) emerges from the module as shown, and is generally located in a reducing fuel atmosphere, which eliminates oxidation of the power lead. The power lead provides electrical output from the stack bundles 203, where the fuel cells operate in the fuel cell mode and where the container metallic base support 210, including support 505, best shown in FIG. 12 carry the weight of the integral bundle assemblies 202 in FIG. 9. As described previously in detail, the cast ceramic air exhaust manifolds, generally shown as 239, and recuperators 240 are, preferably, plural freeze molded castings 90 vol. % to 98 vol. % dense having interfacial ceramic bonds able to withstand temperatures of 1,000° C. Also shown are lateral stack supports 230, open end fuel cell seals 232, stack liner 234, fuel barrier 242, spent fuel channel 282, and minimal loose blanket insulation 236, which needs no machining. Due to individual thermal centers, relative lateral movement between stack and peripheral insulation is reduced for large stacks simplifying peripheral insulation design and minimizing fuel by-pass of the stack. The vertical thermal expansion center has at its top a sliding metallic guide pin 250, also more clearly seen as 250 also in FIG. 13. These guide pins 250 are preferably fixed/attached to the top 261 of the generator enclosure as shown in FIG. 9. The guide pins can then slide into the top of the integral bundle assembly in slide space 262 as it expands. This guide pin, along with ceramic exhaust manifold base legs and keyways, described later, provide a bundle vertical thermal expansion center for the fuel cells. As can be seen, the interior of the generator enclosure 226 contains primarily electrically generating components, no separate internal reformers, ejectors or the like.

Figure 10B:
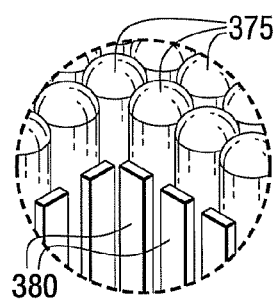
FIG. 10B is an enlarged view of closed end up, reversed fuel cells used in this invention, here shown as tubular SOFC, if used in place of delta/Delta or triangular SOFC.
Figure 10C:
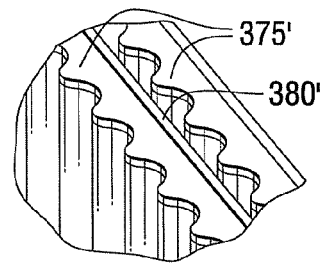
FIG. 10C is an enlarged view of a closed end up, delta/Delta or triangular SOFC, if used in place of tubular SOFC.
Figure 10A:
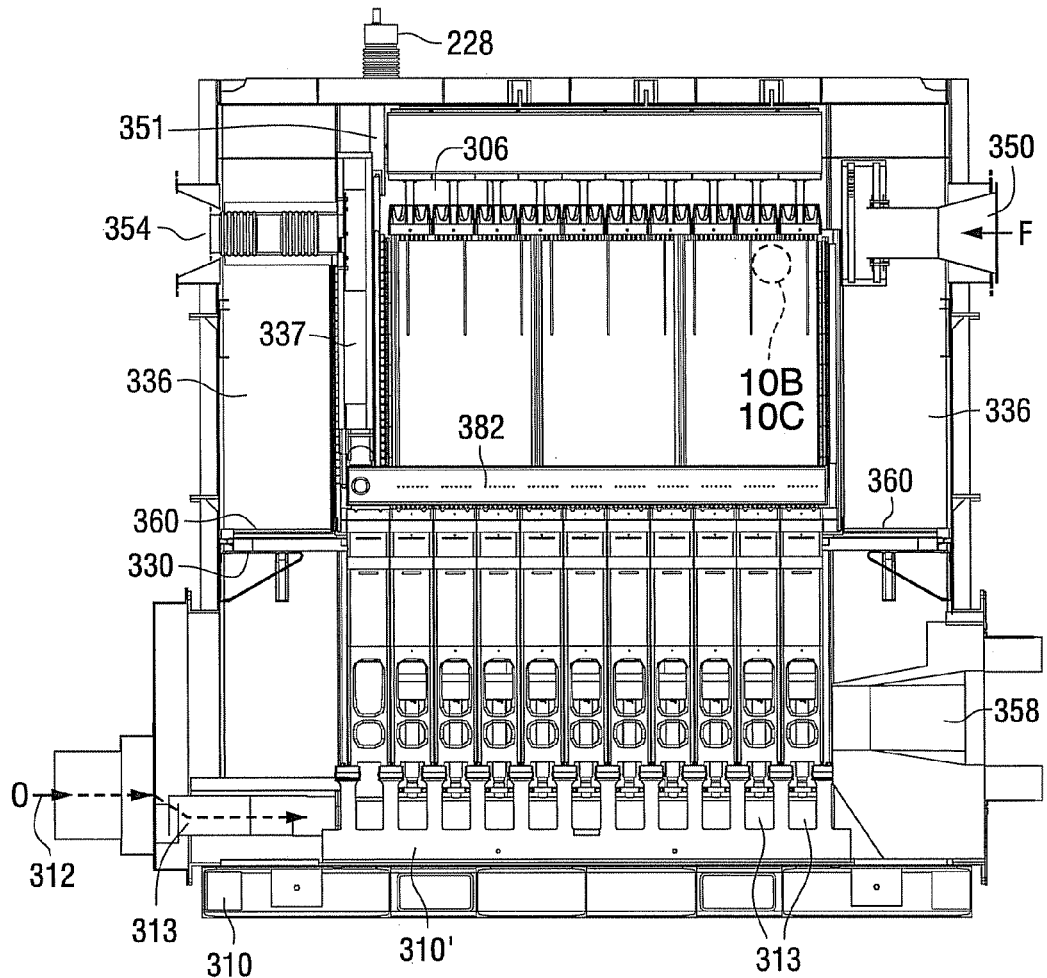
FIG. 10A is an elevational view of the generator architecture showing a side view, more clearly showing the bottom air inlet and top fuel inlet.

Referring now to FIG. 10A, which is equally important as FIG. 9 in illustrating the invention and is a side view of FIG. 9, it more clearly shows top fuel F inlet 350, feeding into inlet fuel plenum 306 where portions 351 of the power leads 228 are located generally in the top fuel inlet environment. Also shown are air O inlet 312 feeding into air inlet manifolds 313 (212 in FIG. 9). Spent fuel recirculation exit 354, from spent fuel channel 382, feeding into spent fuel recirculation plenum 337, passes to an external loop. Module air exhaust outlet is shown as 358. The container metallic base support 310 as well as the metallic base 310' for the ceramic air exhaust manifolds (239 in FIG. 9) is also shown. Oxidant flow is shown by arrows from O. FIG. 10B shows tubular SOFC fuel cell ends 375 on top with cell to cell connections 380.

FIG. 10C shows triangular delta cell ends 375' on top with cell to cell connections 380'. Inside the generator container, there is a fuel barrier 360 (242 in FIG. 9) that separate the fuel and air within the module in the peripheral insulation. The fuel barrier is located at the elevation of the combustion zone of the integral bundle assemblies. The fuel barrier combined with open end seal (232 in FIG. 9) in the integral bundle assemblies form a common elevation that separates the fuel from the air exhaust within the module. The fuel barrier collects any fuel bypass from the peripheral insulation 336 and delivers the fuel to the combustion zone for burning. This prevents any fuel that may bypass the stack from entering the exhaust air stream without burning. During operation, the fuel barrier delivers the fuel to air at temperatures well above auto-ignition.

The fuel barrier is supported by a lateral support 330 that also provides lateral restraint to the integral bundles at an elevation corresponding to the combustion zone 216 in FIG. 9. The lateral support restrains the bundles from lateral movement during shipping and operation. The peripheral insulation 336 located above the fuel barrier is supported by the lateral support.

We now refer to FIG. 11. This provides a clearer view of the basic unit-integral bundle assembly 402 (202 in FIG. 9) for the SOFC generator on its metallic bases 404 and 405. Air O inlet 412 (312 in FIG. 10A) passes air into metallic air manifolds 413, where air manifold exits (513 in FIG. 12) feed into metal or ceramic air boxes 416, where the air 420 flows into the fuel cells 418.

FIG. 12 again shows the basic integral bundle assembly 502 (202 in FIG. 9 and 402 in FIG. 11). This bundle assembly 502 first of all stands on and is supported by cast ceramic air exhaust manifold structures 239 which end on cast ceramic manifold base legs (usually four legs) 552, which have bottom "keyways" 592 which together with the cast ceramic base legs 552 sit on a top metallic base 505 and establish a bottom section of a vertical thermal center axis for expansion shown as axis line 553. This axis passes at the top through hole 586 in closed end casting top 588 for a sliding thermal expansion pin 250 shown in FIG. 13. The air manifolds 512 are shown leading to individual integral bundle assembly air inlets or air manifold exits 513, passing from air manifold outlets 590, leading to metal or ceramic air box 537. Air feed tube holes 538 are shown for air feed tubes which proceed into the individual fuel cells.

Figure 13:
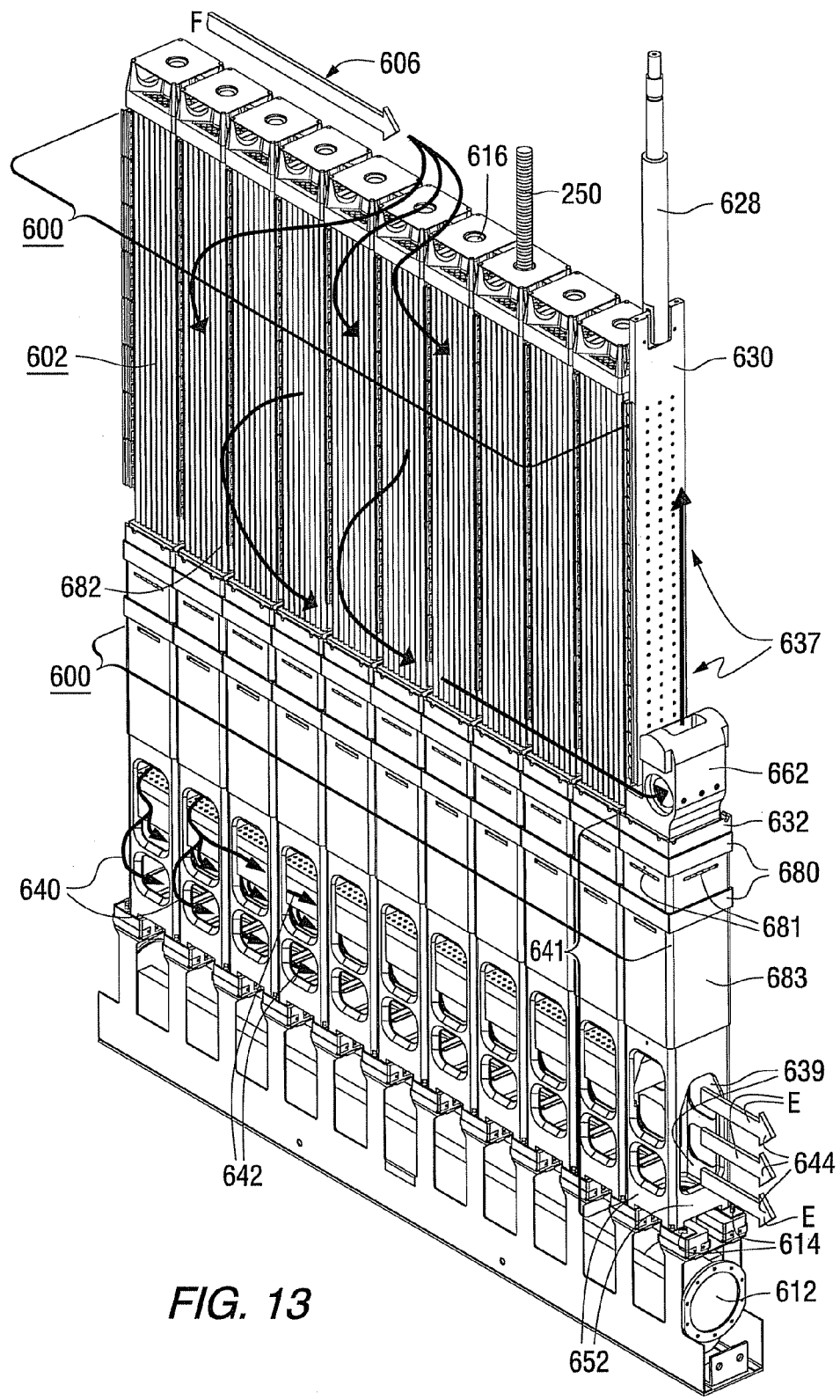
FIG. 13, which best illustrates the invention, is a single row of integral bundle assemblies of FIG. 10A, providing a part of a larger stack of electrically connected integral bundle assemblies.

Importantly, each air exhaust manifold structure has supports for air inlet assemblies or air boxes 537 and interconnected cast ceramic air exhaust manifold structures 239 which all link/connect with adjacent structures to form a bundle row air exhaust (best shown in FIG. 13). Similarly, flexible, compliant wrap-around gaskets 580 (680 in FIG. 13) are disposed between adjacent integral bundle assemblies on all four sides of the integral bundle assembly, not only just between assemblies in a bundle row. These compliant, wrap-around gaskets 580 are preferably disposed at two locations at the approximate elevation of a "combustion zone" 516, where depleted fuel reacts with depleted oxidant to help heat oxidant passing in oxidant feed tubes in "recuperator" zone 540. The resilient gaskets 580 are very soft, spongy fibrous insulation, very compressible and providing relief from horizontal thermal expansion for a single bundle assembly 502 at the support location corresponding to the combustion zone elevation 516. Also shown are electrical connectors 584 which connect to a bus bar and to adjacent bundles (shown in FIG. 13). Spent fuel recirculation channel entrance 582 leading to recirculation channel 382 in FIG. 10A are all connected to the integral bundle assembly, feeding into a single spent fuel recirculation plenum (shown as 337 in FIG. 10A). Open end fuel cell seals 532 seal the open end of the inverted fuel cells 518 in bundle 503.

Having gone through the specific elements shown in FIGS. 9-12, a more general description of operation of the invention is in order. FIG. 10A shows a cross section of the internals of the module. Many of the fundamental support functions of the individual bundles are handled by the integral bundle assembly. Fuel is introduced from an external loop into the top of the unit into an open plenum 306. This plenum is formed by a cavity in the insulation in the top of the module above the elevation of the closed end of the cell. The fuel inlet plenum requires very little hardware to achieve the functionality which shows an advantage of having the cell with the closed end in the up position. Prior art required extensive components to provide a fuel distribution plenum and also support the weight of the cells.

Spent fuel is collected near the open end seal location. The spent fuel is collected by ceramic channels located between the rows of integral bundle assemblies. These channels deliver the spent fuel to one end of the module to a single spent fuel recirculation plenum, shown as 337 in FIG. 10A This plenum transports the collected spent fuel to a higher elevation where penetration is made through the container, by spent fuel exit, 354 to an external loop. This top location has synergy with the power leads being mounted on the same end of the module to reduce wasted space and prevents having to cut a hole in the stack liner at a lower elevation which would require a type of seal to limit fuel by-pass into the peripheral insulation.

As shown in FIG. 13, electrical current is removed from the stack by bus bars 630 usually of nickel and by two power leads usually nickel, where one is shown as 628 in FIG. 13. The power leads are supported by ceramic castings, 641 in FIG. 13, that are part of the integral bundle assemblies. The power leads preferably exit the container vertically in a fuel environment. The power leads are mounted similarly to the integral bundle assemblies with a separate thermal center of expansion for each of the two power leads. This essentially eliminates thermal expansion in the horizontal plane and permits the power leads to be a simple solid cylinder. The only expansion that must be accommodated by the power leads is vertical expansion which is easily achieved with single metallic bellows (260 in FIG. 9). This greatly simplifies the design of the power leads. Further, the fuel environment near the power leads reduces corrosion concerns of the nickel based power leads compared to a design that has power leads in an oxidizing environment. Surrounding the stack is a stack liner (234 in FIG. 9). This liner limits fuel bypass into the peripheral insulation.

It is important to note that with this stack arrangement, very little high temperature structure, excluding the fuel cells, is located above the fuel barrier (242 in FIG. 9). Essentially all the dead weight load of fuel cells is supported by the recuperator casting and the air exhaust castings located below the fuel barrier. Prior art designs required substantial high temperature structure where the cells were in the open end up position. This new inventive design of FIGS. 9-15 is a major simplification and cost advantage. In addition, this new arrangement eliminates axial sliding at the open end seal of the fuel cell. Prior art arrangement always had a sliding seal at the open end of the cell. For complex cell geometry horizontal profiles, eliminating this axial sliding seal is a major advantage.

Ambient Air is introduced into the module and sent to a series of metallic manifolds to feed the individual integral bundle assemblies. With this arrangement, the air manifolds are in close proximity to the bottom of the container and provide some thermal protection of the floor from the exhaust plenum heat. In addition, this places components that are least sensitive to moisture in the bottom of the unit if condensation should occur. Each integral bundle assembly taps into the air manifolds and further distributes the air to each integral bundle assembly. The incoming air pressure, of generally about 8 to 12 inches of water, is above the surrounding air exhaust pressure, so this necessitates providing seals at the point of tapping into the main air manifold by the integral bundle assembly.

An essential aspect of the invention is the modular approach used, and how this provides synergy for accommodating thermal expansion. Each integral bundle assembly 502 in FIG. 12 is assembled with other integral bundle assemblies and electrically connected in series to form a single row 600 of bundle assemblies, shown in FIG. 13. This figure shows a single row assembly that would be joined together in series with other row assemblies to form a larger stack. The base of this row forms the fixture for assembly of the row. The fuel cell bundles are electrically connected in series along the row. The rows are ultimately electrically connected in series to form a larger stack. The power is then removed from the stack and out of the module with two power leads as previously described. Contained in the base is a single air manifold (612 in FIG. 13) that feeds the single row of integral bundle assemblies. Each integral bundle assembly has a set of keyway protrusions 614, shown in FIG. 13, that mate with the ceramic exhaust manifold base legs 652. These legs and keyway protrusions are oriented such that each integral bundle assembly has its own axial vertical thermal center (553 in FIG. 12) located in the center of each integral bundle assembly. The lower portion of the base essentially remains at ambient temperature and is mounted along with other bases to form a larger stack.

The center of each integral bundle assembly does not move due to thermal expansion in the horizontal plane relative to the outside of the container. This greatly simplifies interfacing with the stack for either mechanical support, controlling fuel by pass in the peripheral insulation, and power lead design. As shown in FIG. 13, the thermal expansion is accommodated between the integral bundle assemblies with compliant wrap-around ceramic gaskets 680 between the integral bundle assemblies, the gaskets located below the open end seal 632 and the recuperator zone 683. The bundle is sized such that the closure of the space between the integral bundle assemblies can be accommodated with the fibrous type wraparound compliant gaskets 680. Likewise, compliance is provided in the electrical bundle to bundle connections between integral bundle assemblies.

This novel approach to module architecture never allows thermal expansion to accumulate beyond that of a single bundle regardless of the size of the array of integral bundle assemblies used to form a module for power generation. This facilitates the assembly of module power modules of increasing size with little additional consideration for thermal expansion due to the larger size. At the closed end of the integral bundle assembly, slidable pin 250, generally attached to the top of the generator enclosure, extend down from the top of the generator enclosure container, one for each integral bundle assembly (only one shown), and are aligned with the thermal center at the base of the respective integral bundle assembly. These pins 250 are free to slide in the vertical direction within the top plate holes 616 into an expansion space in the fixtures that capture the close end of the bundles. This is how vertical thermal expansion is accommodated for each integral bundle assembly.

The method of controlling thermal expansion greatly simplifies the lateral support of the stack and the installation of the peripheral insulation. Because the thermal expansion in the horizontal plane is very small, the lateral support of the stack can simply run structurally from the side of the container to the peripheral integral bundle assemblies. Any thermal expansion in the horizontal plane can be easily accommodated by additional gaskets 680 compression. The peripheral insulation can simply be loose fill without the need to be able to significantly compress to accommodate thermal expansion. Prior art required special features to accommodate much larger thermal expansions. The size of the power unit using prior art would become practically limited due to dealing with ever increasing thermal expansion in the horizontal plane of larger internal stacks.

Figure 14:
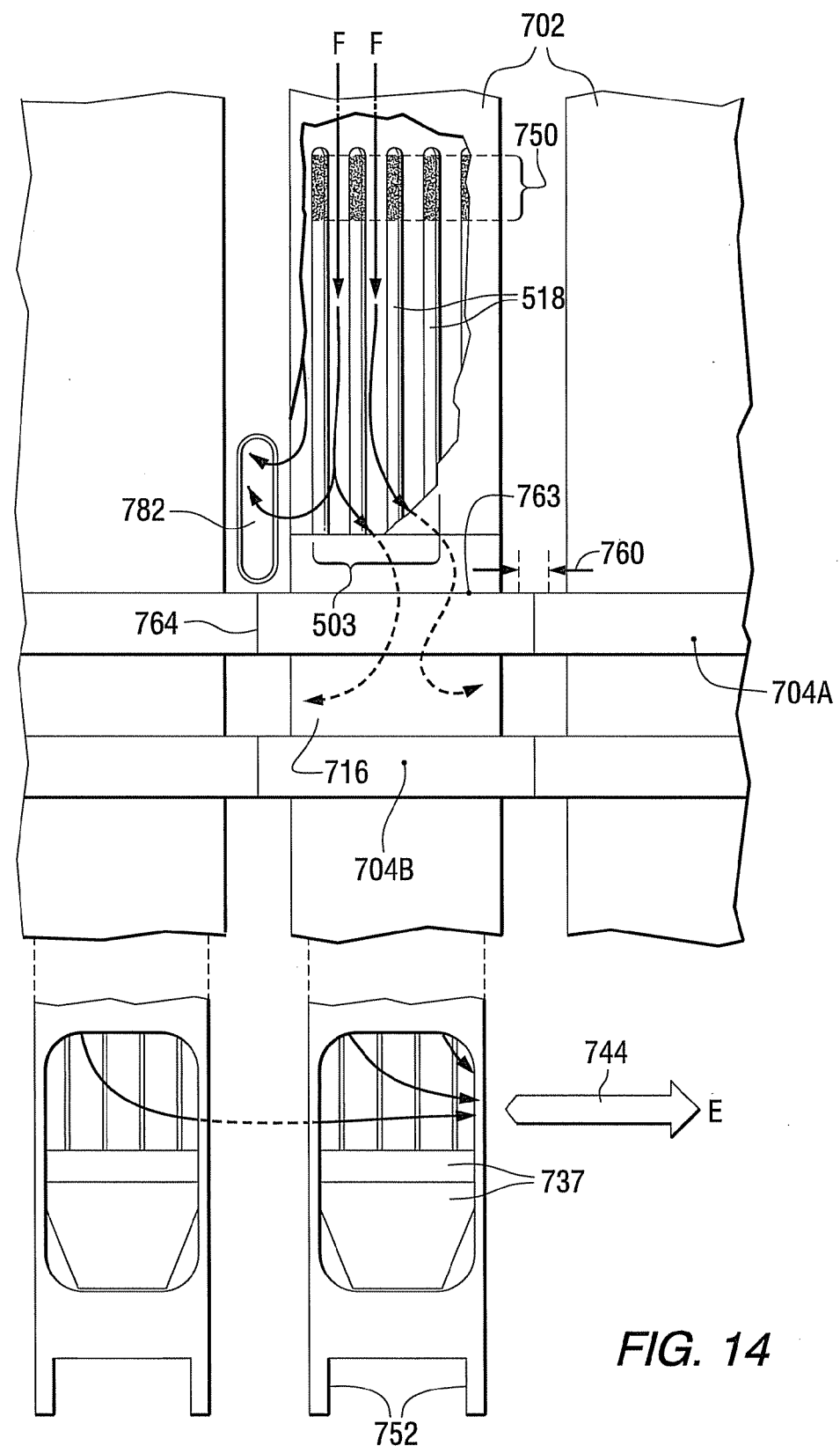
FIG. 14 is a detailed cross-sectional view of the soft, fibrous band seals used as a cushion between module assemblies.

Referring again to FIG. 13 in association with FIG. 14; FIG. 13 illustrates a single row 600 of bundle assemblies all part of a larger solid oxide fuel stack contained in a single module (200 in FIG. 9) with generally shown F, fuel flow along top inlet fuel plenum generally shown as 606, the fuel providing a reducing, rather than oxidizing atmosphere for sliding thermal expansion pin 250 positioned in one of the cell closed end ceramic casting holes 616 and the electrical lead 628. The fuel F passes down the sides of each integral bundle assembly 602 passing within and between the outside of each inverted fuel cell and then passing to spent fuel recirculation channel 682 (shown best as 382 in FIG. 10A), and out through the spent fuel recirculation plenum, 637 (shown best as 337 in FIG. 10A), passing to a spent fuel recirculation exit. Open end fuel cell seals 632, compliant wrap-around gaskets 680, ceramic castings 641 below the spent fuel plenum are also shown, as well as ceramic casting 662 leading to the spent fuel recirculation plenum.

Exhaust, 640 in FIG. 13, is shown passing to the bottom castings 641 and accumulating in volume at point 642 as they pass each individual integral bundle assembly, bundled to provide an exhaust exit to pass as major exhaust E flow 644 at exit 639 before a module exhaust outlet (358 in FIG. 10A). A better view of "keyways" 614 and air inlet manifold 612 are shown. The legs 652 of bottom ceramic casting are also shown.

FIG. 14 illustrates, in part, the fibrous compliant wraparound band seal gaskets 704A and 704B (680 in FIG. 13) which separate the integral bundle assemblies 702 a distance—not shown in scale. The legs 752 of the bottom ceramic casting are also shown as well as air box 737. As shown, inverted fuel cells 518 have fuel passing directly into the fuel cell bundles 503, without any discrete, separate fuel reforming tubes, etc. between fuel cells. The fuel F may be reformed directly (in-situ) in a controlled manner on coated portions 750 of the fuel cell surface, which usually contain nickel. As also can be seen, fuel F passes unrestricted outside the SOFC's 518 and continues down within the bundle 503. Upon reaching point 763 significant amount of fuel F has been consumed in reaction on the fuel cells. At point 763, some spent fuel is recirculated as previously described into spent fuel recirculation channel 782 (382 in FIG. 10A). The remaining fuel is introduced into the combustion zone 716 in FIG. 14. However, it is necessary to limit the spent fuel that could possibly leak between the integral bundle assemblies 702 at the location 764. At this location 764, the relatively small horizontal thermal expansion 760 is accommodated by a fibrous gasket 704A that compresses. This allows each integral bundle assembly 702 to maintain its own thermal center (553 in FIG. 12). A second gasket 704B captures any leakage 716 through gasket 704A and allows this leakage to be reintroduced into the combustion zone 716 via ports (681 in FIG. 13). Exhaust E is shown as 744 (644 in FIG. 13) and thermal expansion is shown by arrows 760.

Figure 15:
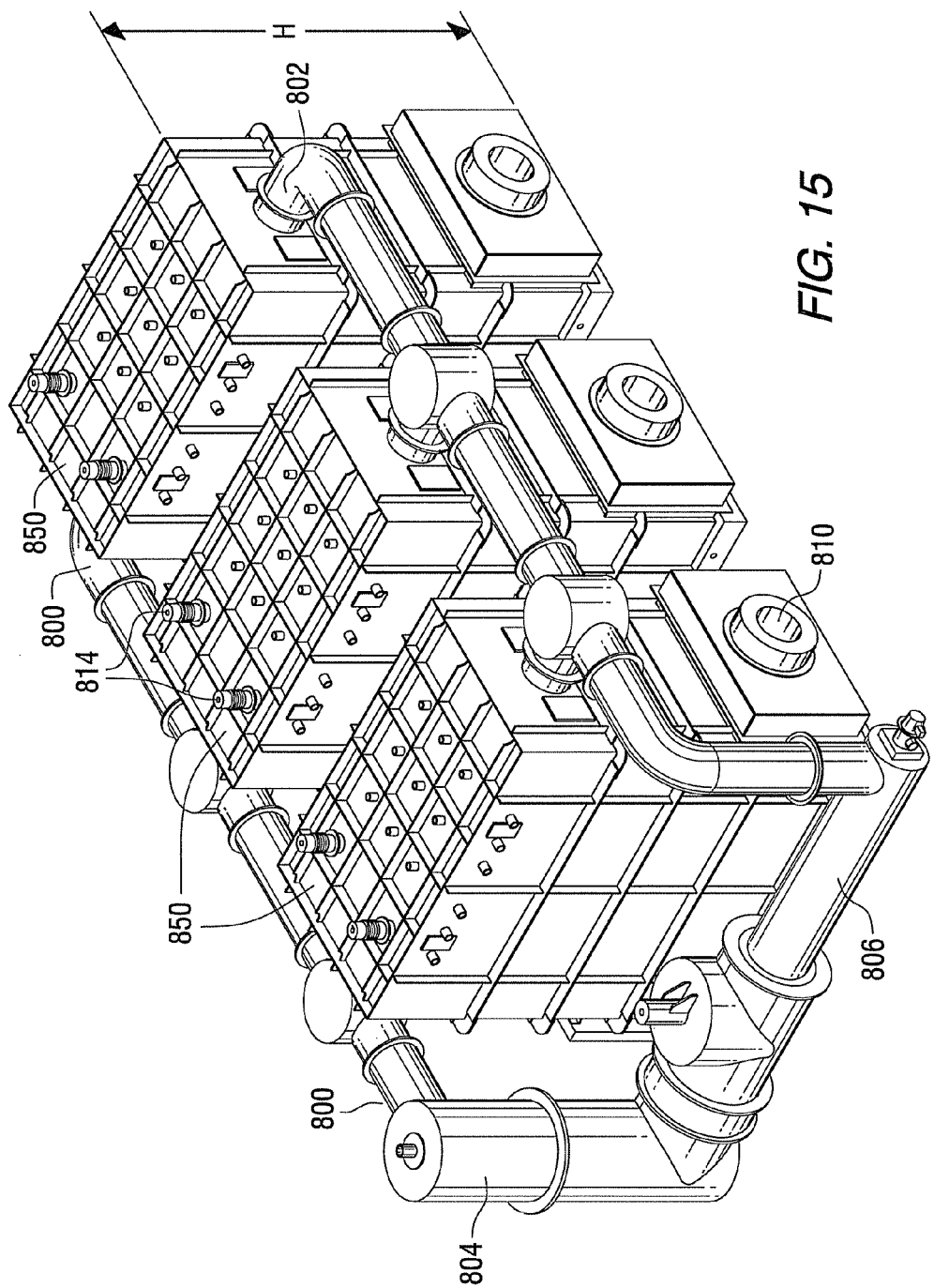
FIG. 15 is an overall three-dimensional view of a group of modules forming a power station with an architecture showing the variety of external air inlets, an anode gas recirculator and external loop heater for three modules in a three-unit SOFC generator system, with H equal to height of about three meters in one embodiment of perceived size.

As shown in FIG. 15, the module has recirculation fuel 800 on the top fuel portion of the generator with recirculator 804. This is done for two reasons. First, the efficiency for heating the module from the fuel side is significantly greater than the air side. Heating from the air side is impaired because the air feed tubes have a recuperative effect on the hot air delivered to the module. The fuel side heater rating is approximately ⅓ that of the air side. Secondly, and by far more important, it eliminates the space required for ejectors and pre-reformers within the envelope of the module as in prior art. This space can then be filled with cells. This reduces the $/kW for all the items necessary to provide the operating environment for the cells. Further, for larger modules, the number of fuel lines required to serve the cells becomes cost prohibitive. For example, with ejectors a container may contain 288 delta/Delta cells. However, a nearly same container can contain 464 cells with the new design of this invention. This has a substantial cost impact in $/kW for these supporting components.

FIG. 15 shows the exterior of three modules, each one enclosing an SOFC stack. The rectangular containers are insulated such that under normal operating conditions the containers are operating above the dew point of the environment contained. There is an external spent fuel recirculation loop 800 that provides for recirculation of the fluid on the fuel side during operation and preheating the module with external loop heater 806 during start up. In the figure, a single external loop supplies services to three separate modules 850. There could be a single external loop for each module. The preference would be based on the economics of the size of the loop required to service any number of single modules. In any case, this external loop would typically contain a device to recirculate the flow, a heating device used to preheat the unit, and ports to introduce fresh fuel into the fuel cell module.

Air from a supply source enters one side of the unit (not shown but 312 in FIG. 10A) and after passing through the modules 850 exits, through air exhaust outlets 810, on the opposite side. This arrangement minimizes the air side flow path within the module and permits the largest possible opening for air to reduce overall pressure drop. For high power density fuel cells it would not be space efficient to have the inlet air and exhaust air exit on the same side of the container. The interior of the container is at near ambient exhaust pressure which reduces the deflection of the container due to internal pressure within the container. The container is rectangular in shape to make efficient use of the space required for the thermal insulation. Fuel inlets are shown as 802, spent fuel recirculation exits as 800. An exterior recirculator is shown as 804, external loop heater as 806, and the separate modules as 850 with power leads as 814. H defines height of the unit which is usually three meters high.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A solid oxide fuel cell module comprising: a plurality of integral bundle assemblies, each integral bundle assembly comprising: a top portion containing an inlet fuel plenum and a top slidable pin to accommodate axial thermal expansion, a bottom portion receiving air inlet feed and containing a casting formed as a ceramic exhaust manifold which casting in plural form provides an air exhaust plenum, which casting also provides a receptacle for an air inlet box and air feed tubes, to receive bottom air inlet feed, where said air feed tubes pass from the air inlet box into the center of inverted tubular, elongated, hollow electrically connected solid oxide fuel cells, said fuel cells having an open end through which the air feed tubes pass and a closed end near the inlet fuel plenum, said fuel cells, providing fuel cell bundles; where the fuel cells operate in the fuel cell mode, where the bottom ceramic exhaust manifolds carry the internal weight of the fuel cell bundles, where the ceramic exhaust manifold includes bottom ceramic legs which provide a central axis with the top slidable pin to provide each integral bundle assembly with a vertical axial thermal expansion center, and wherein the interior of the module houses primarily electrically generating components.

2. The solid oxide fuel cell module of claim 1, wherein the exhaust manifold is located below an internal heat recuperator, the exhaust manifold rests on a base support, both the exhaust manifold and base support carry the internal weight of the fuel cell bundles, each integral bundle assembly is separated from adjacent bundle assemblies by at least one resilient, ceramic band and a portion of the exterior of the fuel cells controls the reforming of fuel, in-situ, on the fuel cell, and where the at least one ceramic band is near the bottom of the fuel cells and provides control of horizontal thermal expansion, the slidable pin is metallic, and the bundle assemblies are surrounded by an outer module container having power leads passing through a reducing fuel environment.

3. A solid oxide fuel cell module comprising: a plurality of electrically and physically connected integral bundle assemblies forming a stack, each stack containing a plurality of integral bundle assemblies comprising: a top portion containing an inlet fuel plenum and a top metallic sliding pin to accommodate axial thermal expansion and a bottom portion receiving air inlet feed and containing a base support which supports a casting formed as a ceramic air exhaust manifold which in plural form provides an air exhaust plenum, which is below and provides a receptacle for an air inlet box and air feed tubes, to receive bottom air inlet feed, the exhaust manifold located below an internal heat recuperator, said air feed tubes passing into the center of inverted, tubular, elongated, hollow electrically connected solid oxide fuel cells having an open end above the recuperator through which the air feed tubes pass and a closed end near the inlet fuel plenum, said fuel cells including fuel cell bundles; all surrounded within an outer module container having power leads passing through the container in a reducing fuel environment to provide electrical output from the stack, where the fuel cells operate in the fuel cell mode and where a base support and bottom ceramic air exhaust manifolds carry the internal weight of the fuel cell bundles, where ceramic exhaust manifold includes bottom ceramic legs resting on the base which said legs provide a central axis with the top sliding metallic pin to provide each integral bundle assembly a thermal expansion center, where each integral bundle assembly is separated from adjacent bundle assemblies by at least one resilient, circumferentially disposed, ceramic band located between the recuperator and the fuel cells; all disposed in a container having exterior fuel feeds, air feeds and exhaust, so that the interior of the container houses primarily electrically generating components.

4. The solid oxide fuel cell module of claim 3, wherein the ceramic exhaust and recuperator are of freeze molded castings.

5. The solid oxide fuel cell module of claim 4, wherein the ceramic exhaust and recuperator castings have interfacial bonds among plural inorganics used which withstand temperatures of 1,000° C. without delamination, and are 90 vol. % to 98 vol. % dense.

6. The solid oxide fuel cell module of claim 3, wherein the castings are made from inorganic materials selected from the group consisting of aluminas, silicas, magnesias, chromites, spinels, clays and mixtures thereof.

7. The solid oxide fuel cell module of claim 3, wherein the castings are made from alumina.

8. The solid oxide fuel cell module of claim 3, wherein the solid oxide fuel cells are tubular.

9. The solid oxide fuel cell module of claim 3, wherein the solid oxide fuel cells are of delta configuration.

10. The solid oxide fuel cell module of claim 3, where the base support is metallic.

11. The solid oxide fuel cell module of claim 3, where the circumferentially disposed, ceramic band is located between the recuperator and the fuel cells.

12. The solid oxide fuel cell module of claim 3, wherein a portion of the exterior of the fuel cells controls the reforming of fuel, in-situ, on the fuel cell.

13. The solid oxide fuel cell module of claim 3, wherein the bottom ceramic air exhaust manifolds have four ceramic legs.

14. The solid oxide fuel cell module of claim 3, wherein the inlet fuel plenum does not support the weight of other internal components.

15. The solid oxide fuel cell module of claim 3, wherein the air inlet feed tubes communicate with an air box below the solid oxide fuel cells and the air box is connected to bottom air inlet manifolds.

16. The solid oxide fuel cell module of claim 3, wherein the solid oxide fuel cells have an open end above a combustion zone, which combustion zone is above a recuperator, where the fuel cells pass through the combustion zone and recuperator and have a closed end near the inlet fuel plenum.

17. The solid oxide fuel cell module of claim 3, wherein the power leads are in a reducing environment and exit through the upper portion of the container.

18. The solid oxide fuel cell module of claim 3, wherein a plurality of integral bundle assemblies each with their own cast ceramic air exhaust manifold are all linked and connected with adjacent integral bundle assemblies.

19. The solid oxide fuel cell module of claim 3, wherein flexible, compliant circumferentially disposed band layers are disposed between adjacent integral bundle assemblies on all four sides of each integral bundle assembly and compensation for horizontal thermal expansion.

20. The solid oxide fuel cell module of claim 3, wherein two seal gasket layers are located on either side of a combustion zone to limit fuel bypass and reintroduce by-pass fuel back into the combustion zone.

21. The solid oxide fuel cell module of claim 3, which contains a plurality of dense ceramic heat recuperators with an integral combustion zone for burning spent fuel and bypass fuel.

22. The solid oxide fuel cell module of claim 3, which contains a plurality of integral bundle assemblies each with its own thermal expansion axis.

23. The solid oxide fuel cell module of claim 3, which contains a fuel barrier to limit bypass fuel flow in peripheral insulation and deliver the by-pass flow to a location with a temperature above auto ignition.

24. The solid oxide fuel cell module of claim 3, which contains a lateral support to provide support for the plurality of castings for shipping and to support horizontal thermal expansion loads.

25. The solid oxide fuel cell module of claim 3, which contains a single non structural liner between the stack and peripheral insulation to confine the fuel within the stack.

26. The solid oxide fuel cell module of claim 3, which contains a module design with an internal arrangement such that bus bar and power lead are free to expand vertically without the need to compensate for horizontal thermal expansion.

* * * * *